US012658059B2

(12) United States Patent
Bieringer et al.

(10) Patent No.: US 12,658,059 B2
(45) Date of Patent: Jun. 16, 2026

(54) SYSTEM FOR TRAFFIC MANAGEMENT OF UNMANNED AIRCRAFT

(71) Applicant: Aeris, LLC, Louisville, CO (US)

(72) Inventors: Paul E. Bieringer, Louisville, CO (US); Andrew Annunzio, Chicago, IL (US); Kyle A. Reinholt, Boulder, CO (US)

(73) Assignee: Aeris, LLC, Louisville, CO (US)

( * ) Notice: Subject to any disclaimer, the term of this patent is extended or adjusted under 35 U.S.C. 154(b) by 324 days.

(21) Appl. No.: 18/305,777

(22) Filed: Apr. 24, 2023

(65) Prior Publication Data

US 2023/0343226 A1      Oct. 26, 2023

Related U.S. Application Data

(60) Provisional application No. 63/333,733, filed on Apr. 22, 2022.

(51) Int. Cl.
*G08G 5/30* (2025.01)
*B64U 10/80* (2023.01)
*G08G 5/20* (2025.01)

(52) U.S. Cl.
CPC ................. *G08G 5/30* (2025.01); *G08G 5/20* (2025.01); *B64U 10/80* (2023.01)

(58) Field of Classification Search
None
See application file for complete search history.

(56) References Cited

U.S. PATENT DOCUMENTS 7,129,857 B1 * 10/2006 Spirkovska ............. G01W 1/00
                                                      701/14
8,606,491 B2 * 12/2013 Subbu ...................... G08G 5/56
                                                      342/36

(Continued)

FOREIGN PATENT DOCUMENTS

WO      WO-2021198043 A1 * 10/2021    ............. B64U 20/80

OTHER PUBLICATIONS

M. Robinson, V. Klimenko, Q. Diao, P. Bieringer, A. Annunzio, Validation of Simulated Urban Microscale Weather Pertinent to Aviation Interests, Jun. 2020, AIAA Aviation 2020 FORUM (Year: 2020).*

(Continued)

*Primary Examiner* — Mahmoud S Ismail
*Assistant Examiner* — Jacob Daniel Underbakke
(74) *Attorney, Agent, or Firm* — Michael Best & Friedrich LLP

(57)      ABSTRACT

Systems and methods for deconflicting small Unmanned Aircraft Systems (sUAS) within a domain. One example system includes a plurality of UAM/AAM vehicles; and a processor configured to: receive environmental data for a domain, the environmental data determined based on operational weather prediction models or weather observations; process the environmental data through an atmospheric model of the domain to determine mesoscale and microscale weather forecast data for the domain and a positional uncertainty of the sUAS vehicles within the domain; generate a Weighted Graph that describes and spans a plurality of possible sUAS vehicle routes over the domain; determine a route and a corresponding flight schedule for at least one of sUAS vehicles within the domain based on the Weighted Graph; and provide the route and the corresponding flight schedule to the at least one of the sUAS vehicles.

22 Claims, 16 Drawing Sheets

(56) References Cited

U.S. PATENT DOCUMENTS

| | | | | |
|---|---|---|---|---|
| 9,898,932 | B2 * | 2/2018 | Brown | G08G 5/26 |
| 11,250,711 | B1 * | 2/2022 | Teague | G08G 5/80 |
| 11,410,562 | B1 * | 8/2022 | Mishra | G08G 5/53 |
| 12,125,392 | B1 * | 10/2024 | Colpitts | G08G 5/76 |
| 2007/0193650 | A1 * | 8/2007 | Annati | B60K 15/00 |
| | | | | 141/83 |
| 2008/0154447 | A1 * | 6/2008 | Spinelli | G05D 1/105 |
| | | | | 701/16 |
| 2010/0114406 | A1 * | 5/2010 | DeJonge | G08G 5/21 |
| | | | | 701/1 |
| 2014/0088799 | A1 * | 3/2014 | Tino | G06F 30/20 |
| | | | | 703/2 |
| 2016/0225263 | A1 * | 8/2016 | Salentiny | G05D 1/0061 |
| 2017/0069214 | A1 * | 3/2017 | Dupray | G08G 5/56 |
| 2017/0337822 | A1 * | 11/2017 | Reinke | G08G 5/21 |
| 2018/0204469 | A1 * | 7/2018 | Moster | G08G 5/34 |
| 2018/0364713 | A1 * | 12/2018 | Foster, II | G08G 5/26 |
| 2019/0012925 | A1 * | 1/2019 | Barker | G08G 5/56 |
| 2019/0259082 | A1 * | 8/2019 | Malewicz | G06F 16/29 |
| 2020/0043348 | A1 * | 2/2020 | Ghosh | G05D 1/101 |
| 2020/0132841 | A1 * | 4/2020 | Lovering | B64D 31/06 |
| 2020/0388169 | A1 * | 12/2020 | Barr | G05D 1/101 |
| 2021/0004870 | A1 * | 1/2021 | Ta | G06Q 30/0244 |
| 2021/0287558 | A1 * | 9/2021 | Schulze | G08G 5/55 |
| 2021/0311205 | A1 * | 10/2021 | Davidson | G01S 19/421 |
| 2022/0028283 | A1 * | 1/2022 | Liberko | G08G 5/55 |
| 2022/0270495 | A1 * | 8/2022 | Pele | G08G 5/30 |
| 2022/0321198 | A1 * | 10/2022 | Devoti | H04B 7/04013 |
| 2022/0381569 | A1 * | 12/2022 | Khan | G01C 21/3446 |
| 2022/0412318 | A1 * | 12/2022 | Zhao | G08B 21/18 |

OTHER PUBLICATIONS

C. Ochoa, E. Atkins, Urban Metric Maps for Small Unmanned Aircraft Systems Motion Planning, Feb. 14, 2021, University of Michigan (Year: 2021).*

* cited by examiner

200

N

Figure 3:
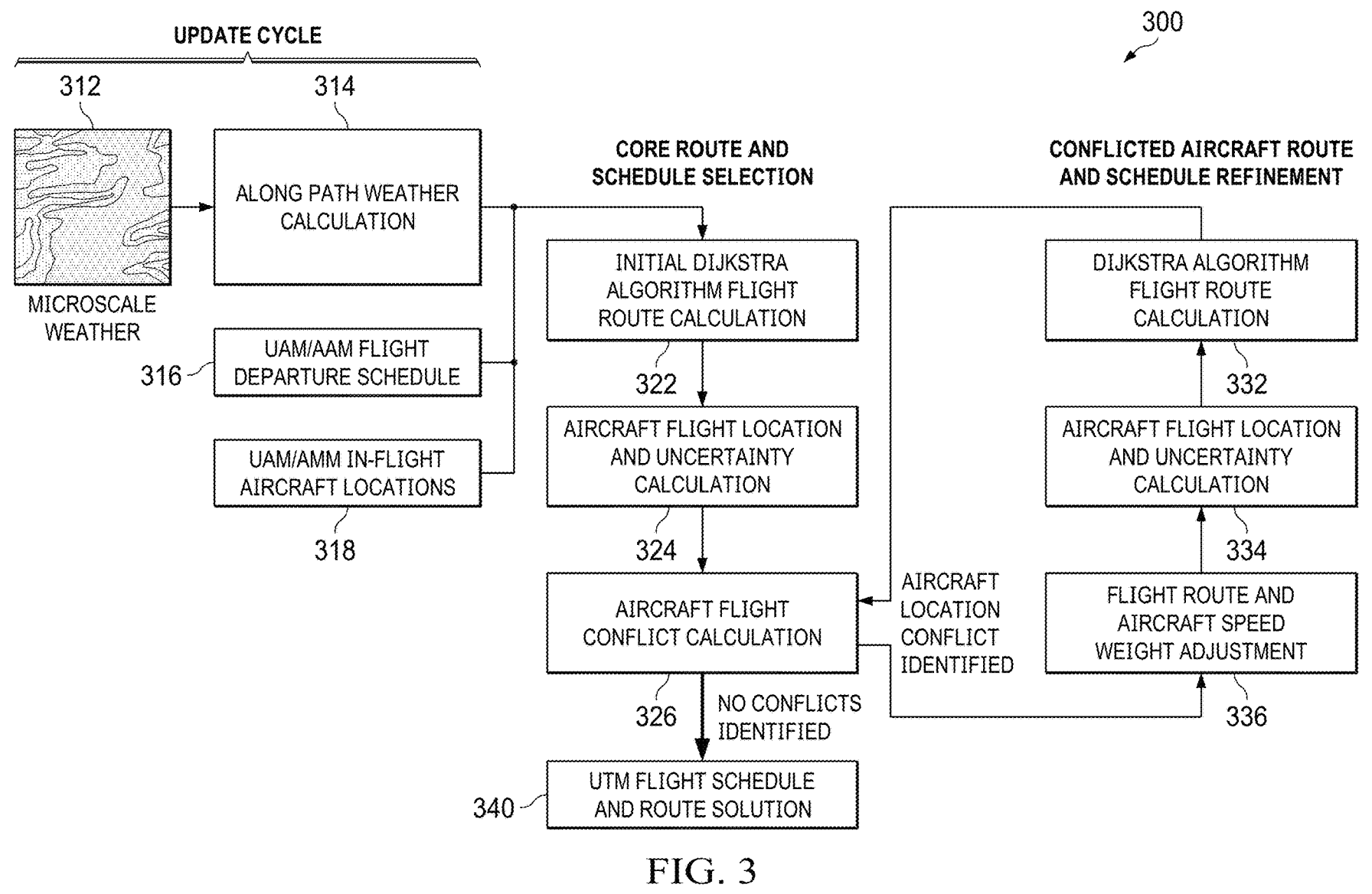

300

CONFLICTED AIRCRAFT ROUTE
AND SCHEDULE REFINEMENT

DIJKSTRA ALGORITHM
FLIGHT ROUTE
CALCULATION — 332

AIRCRAFT FLIGHT LOCATION
AND UNCERTAINTY
CALCULATION — 334

FLIGHT ROUTE AND
AIRCRAFT SPEED
WEIGHT ADJUSTMENT — 336

AIRCRAFT
LOCATION
CONFLICT
IDENTIFIED

CORE ROUTE AND
SCHEDULE SELECTION

INITIAL DIJKSTRA
ALGORITHM FLIGHT
ROUTE CALCULATION — 322

AIRCRAFT FLIGHT LOCATION
AND UNCERTAINTY
CALCULATION — 324

AIRCRAFT FLIGHT
CONFLICT CALCULATION — 326

NO CONFLICTS
IDENTIFIED

UTM FLIGHT SCHEDULE
AND ROUTE SOLUTION — 340

UPDATE CYCLE

314 — ALONG PATH WEATHER
CALCULATION

316 — UAM/AAM FLIGHT
DEPARTURE SCHEDULE

318 — UAM/AMM IN-FLIGHT
AIRCRAFT LOCATIONS

312 — MICROSCALE
WEATHER

1002 — RECEIVE ENVIRONMENTAL DATA

1004 — DETERMINE WEATHER FORECAST DATA AND POSITIONAL UNCERTAINTY

1006 — GENERATE A WEIGHTED GRAPH

1008 — DETERMINE A ROUTE AND FLIGHT SCHEDULE

1010 — PROVIDE THE ROUTE AND FLIGHT SCHEDULE

SYSTEM FOR TRAFFIC MANAGEMENT OF UNMANNED AIRCRAFT

RELATED APPLICATIONS

This application claims priority to U.S. Provisional Application No. 63/333,733, filed on Apr. 22, 2022, the entire contents of which are hereby incorporated by reference.

BACKGROUND

Aircraft System (UAS) Traffic Management (UTM) is a "traffic management" ecosystem for uncontrolled operations that is separate from, but complementary to, the Federal Aviation Administration's (FAA's) Air Traffic Management (ATM) system. Generally, UTM operations involve the delivery of packages and supplies while operating in an unrestricted airspace below 400 meter (m) above ground level (AGL) while Urban Air Mobility (UAM) involves the transport of civilians and larger cargo in unrestricted and restricted airspace. Development of a traditional UTM and a UTM for UAM/AAM includes identifying services, information architecture, data exchange protocols, software functions, infrastructure, and performance requirements to enable the management of low-altitude uncontrolled drone operations.

SUMMARY

The described small aircraft traffic management system ("SATMS") dynamically responds to changes in environmental conditions and airspace demand to plan and schedule routes in real-time for fleets of small Unmanned Aircraft Systems (sUAS). The SATMS integrates detailed predictions of near surface windspeed and turbulence in a graph setting to calculate and select aircraft routes and provide flight scheduling guidance for UTM operations. These graph analytics methodologies are employed to, for example, identify aircraft spacing conflicts, select safe and efficient aircraft routes, and schedule flights. In some embodiments, the described system determines potential hazards along these routes, determines routes with the lowest cost for both prior to take-off and in-flight travel, provides deconfliction of aircraft, and provides metered departure and arrival of aircraft. In some embodiments, the describe system can provide guidance for aircraft moving in opposite directions, at different altitudes, and deconflictions in spaces where altitude changes in aircraft are occurring.

In some embodiments, the system employs a "building-resolving" atmospheric model to determine dynamically evolving building-aware microscale weather for a domain, which can then be used to predict the near surface winds. In some embodiments, the model includes a large eddy simulation (LES) atmospheric model to translate local time-varying weather observations (e.g., urban meteorological stations) or large-scale time-varying environmental conditions from a weather prediction model (e.g., the Advanced Weather Research and Forecasting Model (WRF) or National Oceanic and Atmospheric Administration (NOAA) High Resolution Rapid Refresh (HRRR)) into highly resolved urban micro-scale wind/turbulence information. Such information accounts for local effects associated with, for example, terrain, land-use characteristics, and buildings/structures.

In some embodiments, the SATMS processes raw environmental data and domain specific physical inputs (e.g., buildings and land surface parameters) in the LES model to determine the positional uncertainty of sUAS vehicles due to meteorological factors throughout a domain. In some embodiments, the determined positional uncertainty is combined with aircraft performance parameters along a pre-defined set of UTM flight corridors and departure/arrival aerodromes to maximize aircraft throughput while ensuring that there are no aircraft spacing conflicts due to, for example, positional uncertainty brought about by atmospheric turbulence or larger atmospheric phenomenon. Moreover, the system maintains airspace spacing requirements and minimizes the delay to the aircraft flight schedule.

Accordingly, in one aspect, disclosed herein, are SATMSs for deconflicting small sUAS within a domain. The SATMSs include a plurality of sUAS vehicles and a processor. The processor is configured to: receive environmental data for a domain, the environmental data determined based on operational weather prediction models or weather observations; process the environmental data through an atmospheric model of the domain to determine mesoscale and microscale weather forecast data for the domain and a positional uncertainty of the sUAS vehicles within the domain; generate a Weighted Graph that describes and spans a plurality of possible sUAS vehicle routes over the domain; determine a route and a corresponding flight schedule for at least one of sUAS vehicles within the domain based on the Weighted Graph; and provide the route and the corresponding flight schedule to the at least one of the sUAS vehicles. In some embodiments, the domain includes flight routes for the sUAS vehicles within a geographic region. In some embodiments, the mesoscale and microscale weather forecast data transforms domain specific physical inputs into time-varying realizations of a turbulent flow field. In some embodiments, the domain specific physical inputs include local time-varying weather observations or large-scale time-varying environmental conditions from the atmospheric model. In some embodiments, the Weighted Graph is generated based on pre-determined or time dependent routes for sUAS travel within the domain and the departure and arrival aerodromes. In some embodiments, the Weighted Graph has time varying weights that are defined according to the mesoscale and microscale weather forecast data, characteristics of the sUAS vehicles, and sUAS performance parameters along a set of flight corridors within the domain that correspond each of the sUAS vehicles. In some embodiments, the characteristics of the sUAS vehicles include a speed of each of the sUAS vehicles. In some embodiments, the atmospheric model is based on local conditions of the domain. In some embodiments, the local conditions of the domain include at least one of terrain and land-use, building-resolved environmental conditions, aircraft-specific parameters, and local airspace characteristics. In some embodiments, the route and the corresponding flight schedule are determined based on a positional uncertainty window among airborne and departing flights that are not allowed to overlap. In some embodiments, the positional uncertainty window is calculated via wind variability and flight specific parameters. In some embodiments, the route is optimized with a strict constraint that the positional uncertainty can never overlap over the flight path. In some embodiments, the route and the corresponding flight schedule are determined based on a search of the Weighted Graph using Dijkstra's algorithm. In some embodiments, a search of the Weighted Graph incorporates flight duration or path length, aircraft separation safety requirements, and aircraft arrival delay relative to a planned arrival time. In some embodiments, the atmospheric model includes a LES atmospheric model and a Joint Outdoor-indoor Urban Large Eddy Simulation (JOULES) model. In some embodiments, the processor comprises a Graphics Processing Unit (GPU). In some embodiments, the JOULES model that is adapted to run on the GPU. In some embodiments, the mesoscale and microscale weather forecast data includes a wind field that is separated into a deterministic component and a stochastic component. In some embodiments, the Weighted Graph has dynamic edge weights that are determined based on the deterministic and stochastic components. In some embodiments, the Weighted Graph defines uncertainty in future flight positions of the sUAS vehicles based on the stochastic component. In some embodiments, the route and the corresponding flight schedule is provided to the at least one of the sUAS vehicles via a ground-based controller. In some embodiments, the processor is further configured to provide the route and the corresponding flight schedule to an UTM system that controls sUAS traffic for the domain. In some embodiments, the route and the corresponding flight schedule is provided to the UTM system via a ground-based controller. In some embodiments, the sUAS vehicles move in opposite directions, at different altitudes, and deconflictions in spaces where altitude changes are occurring. In some embodiments, the system operates at a single flight level, multiple flight levels, and with air-traffic moving in opposite directions. In some embodiments, the system is employed for UTM, UAM, and AAM applications.

In another aspect, disclosed herein, are methods for deconflicting sUAS within a domain. The methods are executed by a processor and include receiving environmental data for a domain, the environmental data determined based on operational weather prediction models or weather observations; processing the environmental data through an atmospheric model of the domain to determine mesoscale and microscale weather forecast data for the domain and a positional uncertainty of a plurality of sUAS vehicles within the domain; generating a Weighted Graph that describes and spans a plurality of possible sUAS vehicle routes over the domain; determining a route and a corresponding flight schedule for at least one of sUAS vehicles within the domain based on the Weighted Graph; and providing the route and the corresponding flight schedule to the at least one of the sUAS vehicles. In some embodiments, the domain includes flight routes for the sUAS vehicles within a geographic region. In some embodiments, the mesoscale and microscale weather forecast data transforms domain specific physical inputs into time-varying realizations of a turbulent flow field. In some embodiments, the domain specific physical inputs include local time-varying weather observations or large-scale time-varying environmental conditions from the atmospheric model. In some embodiments, the Weighted Graph is generated based on pre-determined or time dependent routes for sUAS travel within the domain and the departure and arrival aerodromes. In some embodiments, the Weighted Graph has time varying weights that are defined according to the mesoscale and microscale weather forecast data, characteristics of the sUAS vehicles, and sUAS performance parameters along a set of flight corridors within the domain that correspond each of the sUAS vehicles. In some embodiments, the characteristics of the sUAS vehicles include a speed of each of the sUAS vehicles. In some embodiments, the atmospheric model is based on local conditions of the domain. In some embodiments, the local conditions of the domain include at least one of terrain and land-use, building-resolved environmental conditions, aircraft-specific parameters, and local airspace characteristics. In some embodiments, the route and the corresponding flight schedule are determined based on a positional uncertainty window window among airborne and departing flights that are not allowed to overlap. In some embodiments, the positional uncertainty window is calculated via wind variability and flight specific parameters. In some embodiments, the route is optimized with a strict constraint that the positional uncertainty can never overlap over the flight path. In some embodiments, the route and the corresponding flight schedule are determined based on a search of the Weighted Graph using Dijkstra's algorithm. In some embodiments, a search of the Weighted Graph incorporates flight duration or path length, aircraft separation safety requirements, and aircraft arrival delay relative to a planned arrival time. In some embodiments, the atmospheric model includes a LES atmospheric model and a JOULES model. In some embodiments, the processor comprises a GPU. In some embodiments, the JOULES model that is adapted to run on the GPU. In some embodiments, the mesoscale and microscale weather forecast data includes a wind field that is separated into a deterministic component and a stochastic component. In some embodiments, the Weighted Graph has dynamic edge weights that are determined based on the deterministic and stochastic components. In some embodiments, the Weighted Graph defines uncertainty in future flight positions of the sUAS vehicles based on the stochastic component. In some embodiments, the route and the corresponding flight schedule is provided to the at least one of the sUAS vehicles via a ground-based controller. In some embodiments, the methods further comprise providing the route and the corresponding flight schedule to an UTM system that controls sUAS traffic for the domain. In some embodiments, the route and the corresponding flight schedule is provided to the UTM system via a ground-based controller. In some embodiments, the sUAS vehicles move in opposite directions, at different altitudes, and deconflictions in spaces where altitude changes are occurring. In some embodiments, the system operates at a single flight level, multiple flight levels, and with air-traffic moving in opposite directions. In some embodiments, the system is employed for UTM, UAM, and AAM applications. In some embodiments, the domain includes flight routes for the sUAS vehicles within a geographic region. In some embodiments, the mesoscale and microscale weather forecast data transforms domain specific physical inputs into time-varying realizations of a turbulent flow field. In some embodiments, the domain specific physical inputs include local time-varying weather observations or large-scale time-varying environmental conditions from the atmospheric model. In some embodiments, the Weighted Graph is generated based on pre-determined or time dependent routes for sUAS travel within the domain and the departure and arrival aerodromes. In some embodiments, the Weighted Graph has time varying weights that are defined according to the mesoscale and microscale weather forecast data, characteristics of the sUAS vehicles, and sUAS performance parameters along a set of flight corridors within the domain that correspond each of the sUAS vehicles. In some embodiments, the characteristics of the sUAS vehicles include a speed of each of the sUAS vehicles. In some embodiments, the atmospheric model is based on local conditions of the domain. In some embodiments, the local conditions of the domain include at least one of terrain and land-use, building-resolved environmental conditions, aircraft-specific parameters, and local airspace characteristics. In some embodiments, the route and the corresponding flight schedule are determined based on a positional uncertainty window among airborne and departing flights that are not allowed to overlap. In some embodiments, the positional uncertainty window is calculated via wind variability and flight specific parameters. In some embodiments, the route is optimized with a strict constraint that the positional uncertainty can never overlap over the flight path. In some embodiments, the route and the corresponding flight schedule are determined based on a search of the Weighted Graph using Dijkstra's algorithm. In some embodiments, a search of the Weighted Graph incorporates flight duration or path length, aircraft separation safety requirements, and aircraft arrival delay relative to a planned arrival time. In some embodiments, the atmospheric model includes a LES atmospheric model and a JOULES model. In some embodiments, the processor comprises a GPU. In some embodiments, the JOULES model that is adapted to run on the GPU. In some embodiments, the mesoscale and microscale weather forecast data includes a wind field that is separated into a deterministic component and a stochastic component. In some embodiments, the Weighted Graph has dynamic edge weights that are determined based on the deterministic and stochastic components. In some embodiments, the Weighted Graph defines uncertainty in future flight positions of the sUAS vehicles based on the stochastic component. In some embodiments, the route and the corresponding flight schedule is provided to the at least one of the sUAS vehicles via a ground-based controller. In some embodiments, the operations further comprise providing the route and the corresponding flight schedule to an UTM system that controls sUAS traffic for the domain. In some embodiments, the route and the corresponding flight schedule is provided to the UTM system via a ground-based controller. In some embodiments, the sUAS vehicles move in opposite directions, at different altitudes, and deconflictions in spaces where altitude changes are occurring. In some embodiments, the system operates at a single flight level, multiple flight levels, and with air-traffic moving in opposite directions. In some embodiments, the system is employed for UTM, UAM, and AAM applications.

In another aspect, disclosed herein, are non-transitory, computer-readable mediums storing instructions. These instructions, when executed by an electronic processor, perform a set of operations. The set of operations includes receiving environmental data for a domain, the environmental data determined based on operational weather prediction models or weather observations; processing the environmental data through an atmospheric model of the domain to determine mesoscale and microscale weather forecast data for the domain and a positional uncertainty of a plurality of sUAS vehicles within the domain; generating a Weighted Graph that describes and spans a plurality of possible sUAS vehicle routes over the domain; determining a route and a corresponding flight schedule for at least one of sUAS vehicles within the domain based on the Weighted Graph; and providing the route and the corresponding flight schedule to the at least one of the sUAS vehicles.

It is appreciated that the systems and methods in accordance with the present disclosure can include any combination of the aspects and features described herein. That is, systems and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 3 depicts a flowchart of an example process for how a JOULES model and graph minimization can be employed by embodiments of the present disclosure;

DETAILED DESCRIPTION

Figure 1:
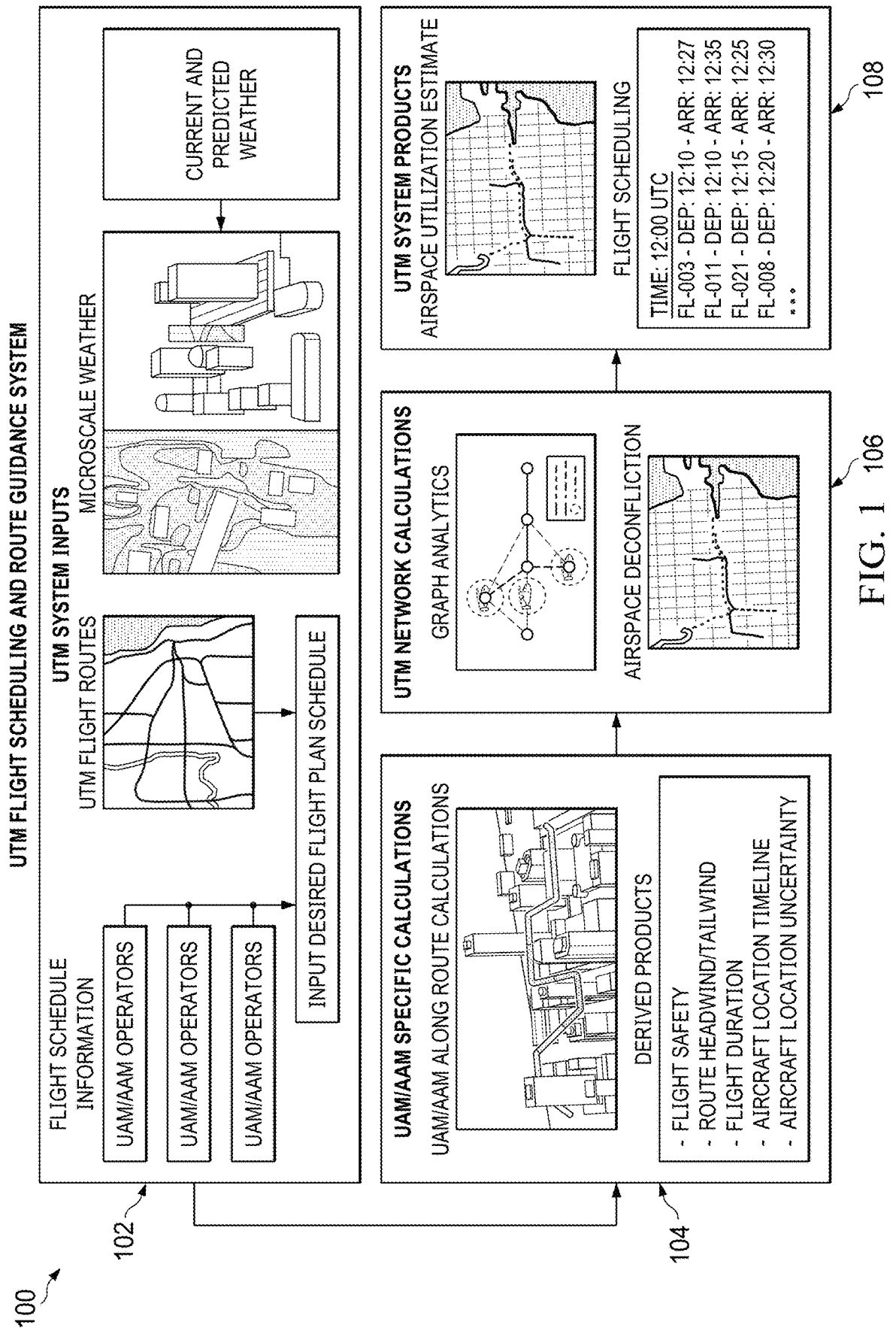
FIG. 1 depicts an example embodiment of the described SATMS.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings.

Embodiments of the present disclosure are generally directed to systems and methods for dynamically responds to changes in environmental conditions and airspace demand to plan and schedule routes in real-time for fleets of sUAS vehicles. The system calculates and selects aircraft routes to provide flight scheduling guidance for UTM, UAM, and AAM operations by integrating, for example, detailed predictions of near surface winds as well as turbulence at meter-scale resolutions with graph analytics methodologies based on, for example, Dijkstra's search algorithm. These graph analytics methodologies are employed to, for example, identify aircraft spacing conflicts, select aircraft routes, and schedule flights.

Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, the term small Unmanned Aircraft Systems (sUAS), includes semi and fully autonomous aircraft deployed for local, intraregional, and urban flight at low altitudes for applications including, but not limited to, cargo delivery, public services, passenger transport, and national security and defense.

As used herein, the term "domain" refers to the volume encompassing the UTM, sUAS airspace.

Overview

Generally, sUAS aircraft must maintain a prescribed separation/distance from each other. In some embodiments, the calculation of this distance is a function of a combination of uncertainty information associated with communication, navigation, and surveillance uncertainty, as well as uncertainty in the future position due to wind speed/direction variance from the LES model and weather uncertainty, which is directly calculated from the JOULES model.

In some embodiments, the described system employs weighted graphs that provide natural machine learning problem design and structure for route planning. Generally, a weighted graph is a discrete representation of a solution space where line segments that describe the routes (edges) are joined by nodes. Edge weights are prescribed to each of these line segments that describe a cost for traversing each line segment. For example, in various maps applications, edge weights represent the time required to traverse a line segment, and search algorithms explore all possible routes to determine the route of lowest cost.

In some embodiments, Dijkstra's algorithm is employed to search weighted, directed graphs. Generally, the algorithm iteratively searches the solution space for the route of lowest cost. In some embodiments, the described system employs a weighted graph approach with the shortest routes determined according to Dijkstra's algorithm adapted to UAM/UTM Operating Environment (UOE). A successful UOE generally includes weather forecasts and aircraft specific characteristics. These weather forecasts are accurate and of sufficient fidelity to model small scale turbulent motions that impact the stability and battery consumption of the aircraft.

To provide more accurate weather forecast data, in some embodiments, the described system uses the JOULES model, which is an urban winds and turbulence resolving atmospheric prediction model. In some embodiments, the system separates the wind field into a slow varying component, and a stochastic, high frequency component. In some embodiments, the slow varying component of the wind field is used to define the dynamic edge weights for a weighted graph, while the stochastic component is used to define the uncertainty in the future flight position. In some embodiments, this uncertainty information is used in post processing after running Dijkstra's algorithm to perform deconfliction, where a conflict is defined as the overlap of the locational uncertainty information from an aircraft with the locational uncertainty of any other aircraft inflight. Generally, the weather information is dynamic, and therefore, the edge weights and computed growth in location uncertainty are also dynamic.

In some embodiments, deconfliction is performed prior to aircraft departure and also while the aircraft is in flight. In some embodiments, when a future conflict exists prior to departure, a delay is added to the flight and Dijkstra's algorithm is executed again. In some embodiments, this process iterates until the flight finds a conflict free, lowest cost path. If such conflicts exist after departure, which can occur due to changing weather conditions, then the flight velocity can be adjusted, and a similar iterative process performed.

Example System

Figure 2:
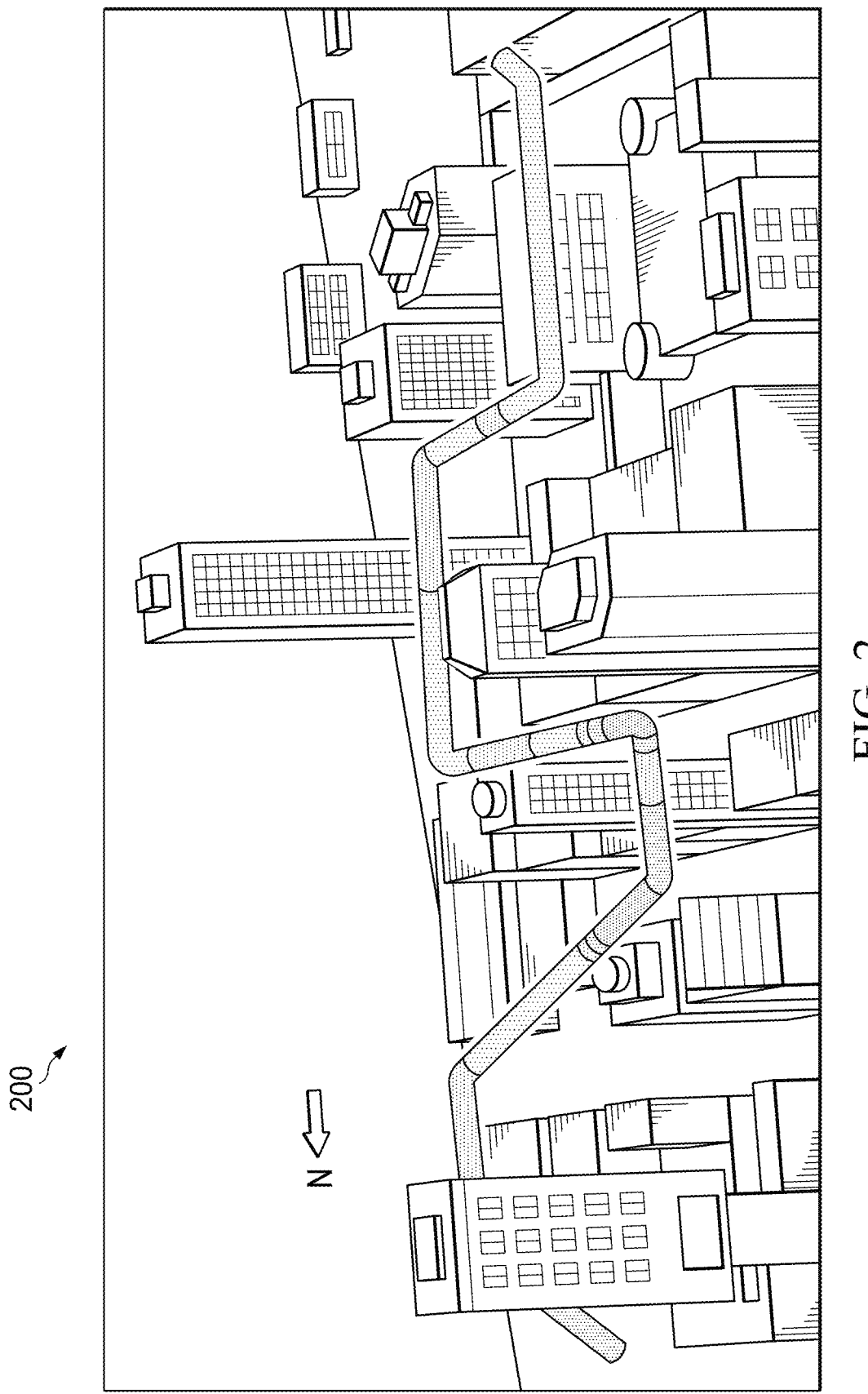
FIG. 2 depicts an example of a flight path through an urban environment.

FIG. 1 depicts an example embodiment of the described SATMS 100. As depicted, system inputs 102 (e.g., weather data) are processed by the UAM/AAM calculations module 104 to determine, for example, accurate, high-resolution estimates of the winds and turbulence along the UTM or UAM/AAM flight routes, which represent sources of uncertainty (e.g., weather/weather patterns). For example, in some embodiments, the UAM/AAM calculations module 104 employs a JOULES and a LES atmospheric model to translate local time-varying weather observations or large-scale time-varying environmental conditions from operational weather prediction models into the highly resolved urban micro-scale wind/turbulence information that can account for localized impact of terrain, land-use characteristics, and buildings/structures on flight path winds. As an example, a four-dimensional (e.g., x, y, z, time) model, which includes UTM or UAM/AAM operations specific parameters along a flight path, is generated by the UAM/AAM calculations module 104 based on the system inputs 102. In some embodiments, this four-dimensional model data is combined with aircraft performance parameters along a pre-defined set of UTM or UAM/AAM flight corridors and departure/arrival aerodromes. FIG. 2 depicts an example of a UAM/AAM flight path 200 through an urban environment. The flight path 200 is a horizontal velocity estimate derived from JOULES.

In some examples, the JOULES model incorporates the detailed variability of the various winds encountered during a flight, which are important to the operation of the sUAS vehicles. As such, in some embodiments, the described system employs a JOULES simulation whose boundary and initial conditions are driven by the HRRR model, or other atmospheric models, or local observations. The outputs from operational systems (e.g., HRRR) and local observations provide the inputs for JOULES to reconstruct and predict the time varying microscale weather conditions (e.g., wind direction, wind speed, visibility, and precipitation) at a higher temporal and spatial resolution than the larger scale models.

Microscale LES weather simulations are notoriously computationally expensive, and until recently, LES was a research and development modeling tool as it was difficult to achieve solutions at faster than real-time speeds for the types of computation domains used by the UAM/AAM calculations module 104. To overcome this limitation, in some embodiments, the described system employs the JOULES atmospheric model that is specifically adapted to run on a GPU. The GPU-LES within JOULES enables complex atmospheric wind and turbulence calculations to be completed in operationally relevant timeframes. This fast-running, atmospheric modeling technology provides time-varying, four-dimensional mesoscale and microscale weather reconstructions and predictions capable of resolving the detailed structures of the near-surface winds and turbulence associated with flows over and around buildings and other obstacles along the aircraft flight path (as depicted in FIG. 2).

In both areas with and without buildings, the LES atmospheric model more accurately represents the variability in winds with height as compared to conventional mesoscale atmospheric models (e.g., National Oceanic and Atmospheric Administration (NOAA) North American Mesoscale Forecast System (NAM) and/or the HRRR). Moreover, the LES atmospheric model provides detailed statistical information on the wind speed/direction variability that can be used to calculate uncertainty estimates for aircraft locations. Further, large scale atmospheric conditions determined from mesoscale models (e.g., the NAM and HRRR) can be included in the JOULES atmospheric model. As a result, the JOULES atmospheric model accurately models time dependent mesoscale wind direction shifts and wind speed changes as well as the impact of the mesoscale shifts on smaller scale turbulence, whose impacts can be crucial for sUAS safety and UTM or UAM/AAM operations. These building-aware, microscale simulations provide detailed winds and turbulence analyses and predictions for the entire UOE.

Furthermore, the use of LES enables JOULES to transform these operational mesoscale model and observational inputs into more detailed, turbulence resolving microscale wind field solutions. Because light weight sUAS vehicles have significantly lower maximum airspeeds and flight performance characteristics than larger general and commercial aircraft, SUAS aircraft is more susceptible to changes in the winds. Atmospheric turbulence, especially in urban environments, is one source of hazardous and localized wind direction and speed changes that are not explicitly resolved by the operational weather prediction models like the NAM and the NOAA HRRR.

Moreover, moving a LES model from a CPU architecture to a GPU architecture increases the computation speed greater than 150-fold and allows for the calculation of microscale flow field solutions at faster than clock speed. The GPU implementation of this modeling technology enables the described system to complete calculations in an operationally relevant timeframe to continuously account for the impacts of environmental conditions on UAM/AAM aircraft.

In some embodiments, the UTM network calculations module 106 and the UTM flight scheduling module 108 employ graph analytics to determine, through the various models, routes, and corresponding flight schedules respectively for both the in-flight and departing SUAS vehicles by processing the received data through these four-dimensional, microscale, flow field models. The determined flight scheduling and route guidance include information that can be used to help ensure, for example, safe aircraft separation, merging and sequencing of aircraft along the flight routes, and metered arrivals at destination vertiports/aerodromes.

In some embodiments, the UTM network calculations module 106 employs graph analytics to incorporate flight duration or path length and aircraft arrival delay relative to the planned arrival time. In some embodiments, the employed graph analytics incorporate a strict requirement that vehicles cannot fly within a computed distance of each other, which greatly increases the complexity of the algorithm. In some embodiments, the employed models are configured to prioritize the route speed/length; however, these models may also be configured to prioritize other relevant metrics, such as battery consumption, ability to complete a round trip flight with adequate reserve power, or the prioritization of some aircraft operations.

In some embodiments, employed graph analytics incorporate low altitude microscale weather forecasts to address the impact of the winds and turbulence on the aircraft throughout its path from a departure to a destination location. In some embodiments, the location-specific microscale variability in the forecasted weather information is used to provide an estimate of the uncertainty of the aircraft location. Generally, variability in the winds is dependent on a variety of factors such as the time of day, wind speed, wind direction, altitude, and large-scale shifts in weather conditions. Locations with higher surface roughness or tall buildings will typically have higher locational uncertainties due to the enhanced building induced turbulence present in these locations. The location uncertainty estimate allows for the optimal flight route selection to be based on a combination of the turbulence induced weather uncertainty and aircraft characteristics. This enables the elimination of flight paths where it is difficult to maintain adequate aircraft spacing making them too hazardous for UTM or UAM/AAM operations in situations where sudden shifts in weather or variability in conditions due to building induced turbulence are present. Further, incorporating such information into an uncertainty window of the aircraft location provides a natural setting for flight deconfliction at flight route merge and sequence points and aerodrome locations.

By combining fast running microscale weather predictions with graph analytic data analysis techniques, the described system can provide a faster-than-real-time determination of the best combination of aircraft routes (via the UTM network calculations module 106) and flight schedules (via the UTM flight scheduling module 108) based on building-resolved environmental conditions, aircraft-specific parameters, and local airspace characteristics. The fast-running GPU-LES atmospheric model combined with the computationally efficient graph analytics approach enables the system to provide this information in an operationally relevant timeframe and provides scheduling predictions up to, for example, several hours in advance. In some embodiments, aircraft "in-flight" conditions are accounted for to ensure flight safety requirements are maintained and that route conflicts and schedules are continuously deconflicted. Further, the system is dynamic in that it can adapt to varying environmental conditions such as wind speed and wind direction changes, as well as time dependent changes in the availability of high-density routes. Moreover, the graph-based optimization approach can be readily adapted to different UTM or UAM/AAM AOOs with different operational constraints, flight corridors, building footprints, or land use distributions.

Example Process

Figure 8:
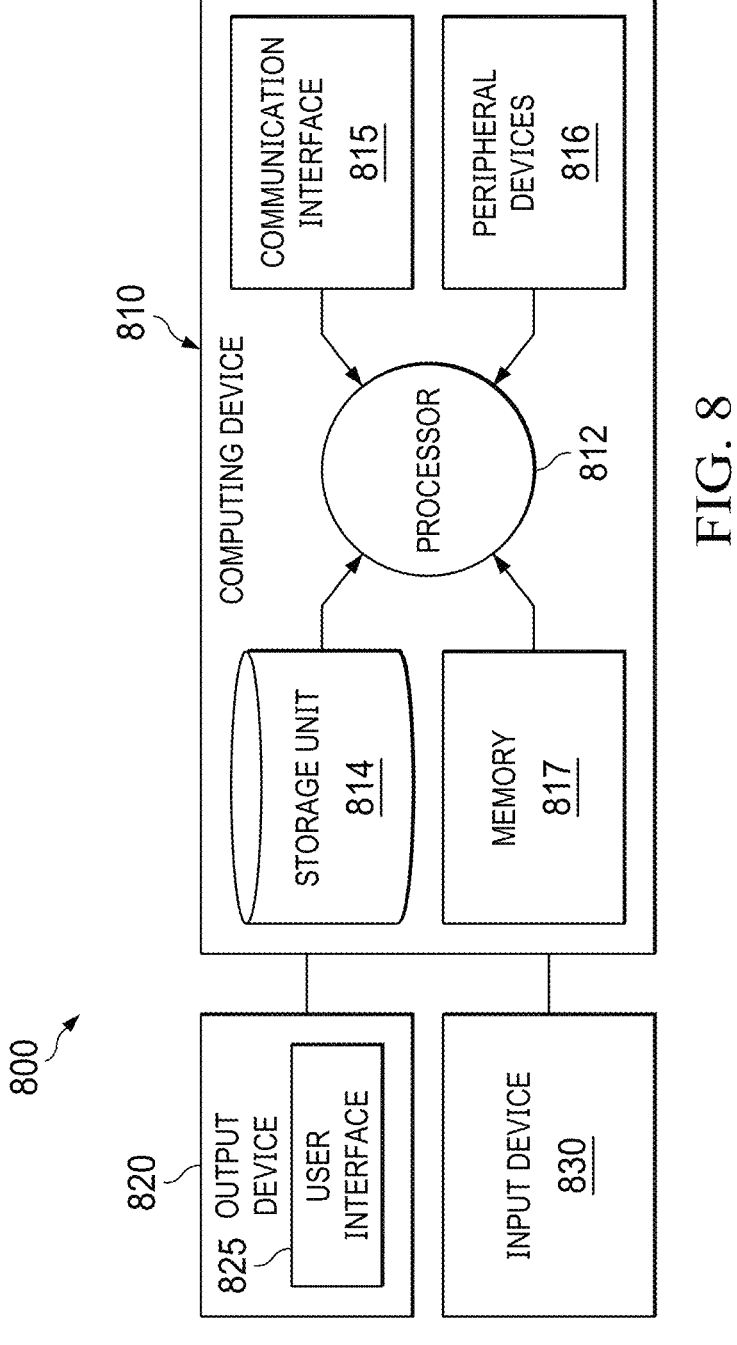
FIG. 8 depicts an example system that includes a computer or computing device that can be programmed or otherwise configured to implement systems or methods of the present disclosure.

FIG. 3 depicts a flowchart of an example process 300 for how a JOULES model and graph minimization can be employed by embodiments of the present disclosure. For clarity of presentation, the description that follows generally describes the process 300 in the context of FIGS. 1 and 2. However, it will be understood that the process 300 may be performed, for example, by any other suitable system or a combination of systems as appropriate. In some embodiments, a processor, such as described below with regard to FIG. 8, is configured to execute the process 300.

As depicted, the process 300 begins with up to date, real-time weather analyses and forecasts 312 that is continuously provided in an update cycle by a JOULES weather forecasting engine. In some embodiments, the JOULES model is run on a GPU allowing for real-time turbulent resolving flow field forecasts. These weather forecasts 312 are employed to define 314 the weights, or cost (along path weather calculation) within the graph minimization algorithm that performs route planning for sUAS departure requests. These along-path weather calculation 314 along with a UTM or UAM/AAM flight departure schedule 316 and in-flight locations of the sUAS that are being scheduled by the described system 318 are provided to an initial flight route calculation model 322 employing Dijkstra Algorithm.

Once the dynamic edge weights are determined, the iterative minimization and deconfliction algorithms are run so that the flight trajectory is free from hazards due to conflicts in the domain or adverse weather. As depicted, aircraft flight location and uncertainty, and aircraft flight conflicts are determined at 324 and 326 respectively. This information is refined during flight route and aircraft speed weight is adjusted at 336, aircraft flight location and uncertainty is determined at 334, and flight routes are determined via Dijkstra algorithm at 332. Finally, the UTM or UAM/AAM flight schedule and route solution is provided at 340. This solution includes, for example, metered departure and arrival of aircraft; the safest and/or lowest cost routes for each aircraft, and user interface to transmit flight information.

UTM Scenario and Environmental Data Set Development

Figure 4:
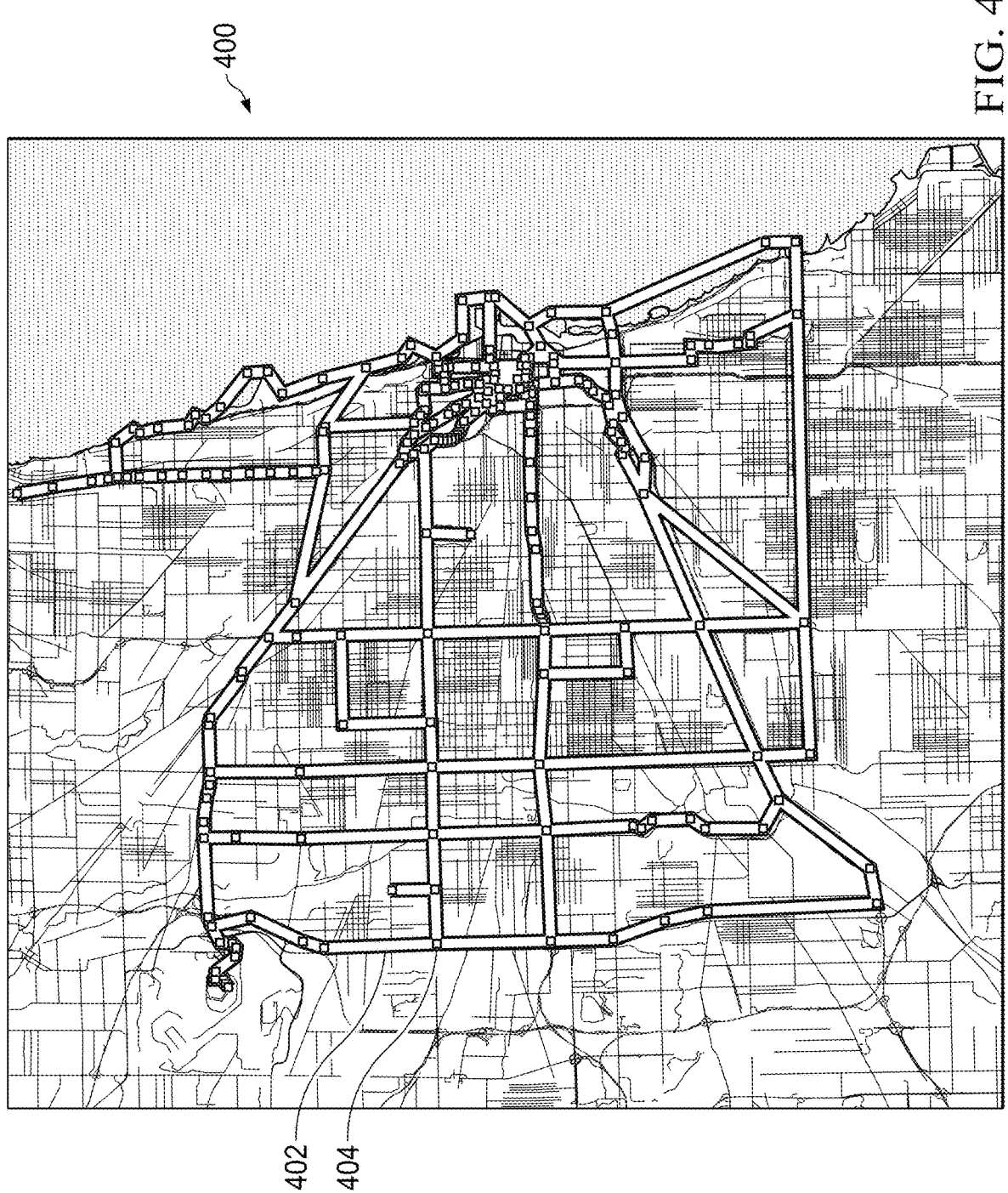
FIG. 4 depicts an example of a full UTM area of operations (AOO) with flight routes 402 and route nodes 404 that represent route merge points and vertiport locations.

FIG. 4 depicts an example of a full UTM AOO 400 with flight routes 402 and route nodes 404 that represent route merge points and vertiport locations. The example UTM AOO 400 covers approximately 30 square kilometers that extends from downtown Chicago, IL to O'Hare airport. This area was selected because it is a large city that provides a diverse environment with a central business district of densely packed large buildings where the urban core is set in an environment with a variety of natural UTM or UAM/AAM flight corridors (e.g., Lake Michigan and rivers) surrounded by mixed lower density urban environment of localized residential, commercial, and industrial use. As depicted, existing transportation corridors were used to define the location of candidate principal route corridors through which higher volumes of aircraft traffic may travel due to sUAS noise and safety-based restrictions. Secondary routes were also defined to account for initial departure and final arrival locations that were off the primary routes. The depicted act shows a scenario where 10-15 UTM or UAM/AAM operators are distributed throughout this UOE with varied departure and destination locations, and numbers of desired flights throughout the demonstration period. This information was consolidated into a collective schedule that contains "desired" flight schedules that would be requested by the UTM or UAM/AAM operators. The requested flight plans were designed to represent a situation where these operators will be making flight operation requests without knowledge of any other operator.

In some embodiments, time varying weather data is produced at a 1-minute or higher frequency. This data can be used for estimating, for example, the flight-path relative headwind, tailwind, and wind speed variance within the various models. In contrast to weather analysis and prediction at the meso and continental scales (e.g., greater than 3-5 kilometer (km) horizontal resolutions) in which most people are familiar, weather observations of sufficient spatial and temporal resolution are not available at the microscale (e.g., spatial resolutions less than 100 meters (m) horizontal resolutions) to produce explicit analysis and predictions of winds and turbulence at this scale. To address this limitation, the described system employs a statistical approach where the mean and variance of the weather conditions are used to provide probabilistic information.

In some embodiments, a comparable approach is leveraged in the UAM/AAM route selection and flight scheduling algorithm. For example, periodic intervals (e.g., –5 minutes) where wind information from 30 minutes prior and 30 minutes after is used to estimate the along path wind speed and wind speed variance for the flight routes in the UTM. In some embodiments, the models determine this calculation within a moving window (e.g., every hour) to then generate a time varying estimate of these parameters, which impact aircraft flight performance. In some situations, such as in rapidly changing meteorological conditions, the window of the time average is adjusted to assure stationarity and representativeness in the statistical calculations.

UTM Flight Schedule and Route Estimation Algorithm Development

In some embodiments, the described system employs models to translate the route and aircraft specific data (positional uncertainty) from the first set of calculations into UTM network route and flight schedule guidance. In some embodiments, the models take into account various criteria, such as safe flight operations (ensuring safe aircraft separation is maintained), metered operations at departure and arrival aerodromes, efficient merging and sequencing of aircraft using major UTM route corridors, UAM/AAM flight time, and minimizing delays as measured by the difference between schedule arrival time and the projected arrival time.

In some embodiments, the described system estimates shortest paths using a time dependent graph. In some embodiments, the following are assumptions made for the UTM environment and operations: 1) a set departure time; 2) travel occurs only along available and viable flight routes; 3) airborne aircraft have priority in transportation routes over departing aircraft; 4) in the absence of wind, aircraft airspeeds are assumed to be constant; and 5) uncertainty in ground speed and location predictions can occur due to weather uncertainty. In some embodiments, the described system employs other measures such as aircraft characteristics, aircraft prioritization in addition to the shortest path as part of the optimization. In some embodiments, aircraft are assumed to allowed to operate at non-constant airspeeds.

As described above, in some embodiments, the meteorological outputs from JOULES are transformed from a three-dimensional grid to along-flight-path winds for each of the route segments over time periods of the simulation. In some embodiments, these meteorological inputs are combined with assumptions on sUAS travel characteristics to derive the time dependent weights for each route segment in the UTM. In some embodiments, the weights represent the time to traverse a route segment.

In some embodiments, determination of the lowest cost path is accomplished using Dijkstra's minimization algorithm, which is a minimization algorithm for Weighted Graphs that searches the solution space to determine the route of minimal cost. Dijkstra's algorithm is greedy in the sense that the computation ignores the trajectory of all other sUAS flights in route. In some embodiments, potential aircraft conflictions assessed in automated fashion after running Dijkstra's algorithm and are addressed via a delay in departure time or a change in aircraft flight speed. In some embodiments, the steps of the algorithm are as follows:

Pre-Flight:
1) Define dynamic edge weights based on the JOULES simulation and assumed aircraft speed. These edge weights are the cost for traversing a specific route.
2) In forecast space, compute the future uncertainty in aircraft locations for all aircraft in flight.
3) Run Dijkstra's algorithm to determine the optimal path for the departing flight.
4) Compute the locational uncertainty for the departing flight in forecast space.
5) Check if the positional uncertainty envelope from the departing flight overlaps with the positional uncertainty envelope from any of the flights en-route
   i) If there is any overlap, add a departure delay and rerun step 3.
   ii) If none of the positional uncertainty estimates overlap, then move to step 6
6) Move to the next departure In-Flight Planning:
1) Update weather forecast information as it becomes available.
2) Run Dijkstra's algorithm for all airborne flights with the new weather information to determine if a new route has become optimal.
3) Check if the positional uncertainty envelope from the flight overlaps with the positional uncertainty with any other flight en route.
   i.) If true, then adjust the speed of the aircraft and rerun step 2.

Example Graph

Figure 5A:
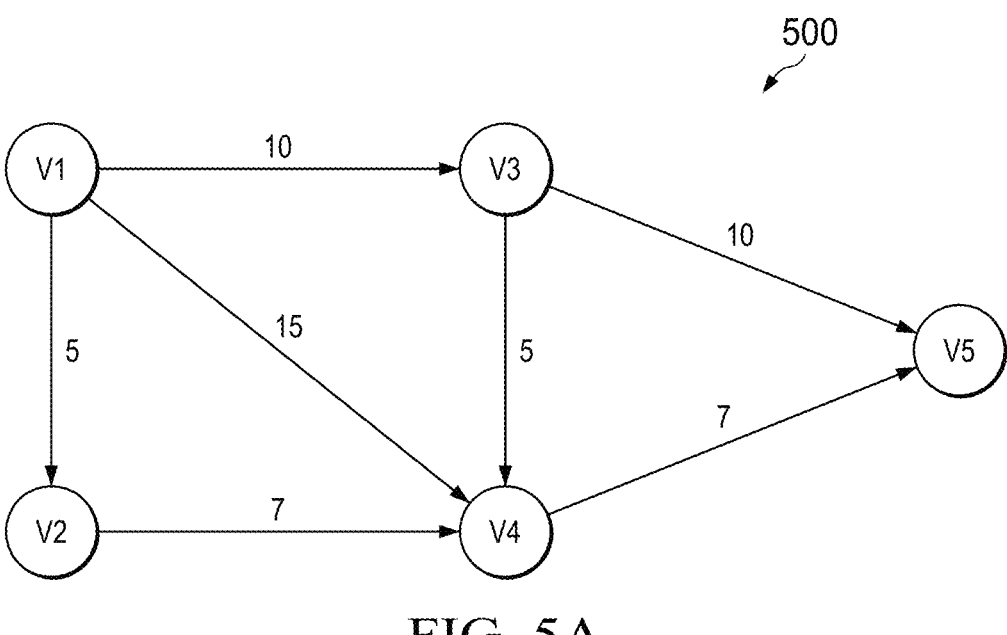
FIGS. 5A and 5B depicts example Graphs that can be employed by embodiments of the present disclosure.
Figure 5B:
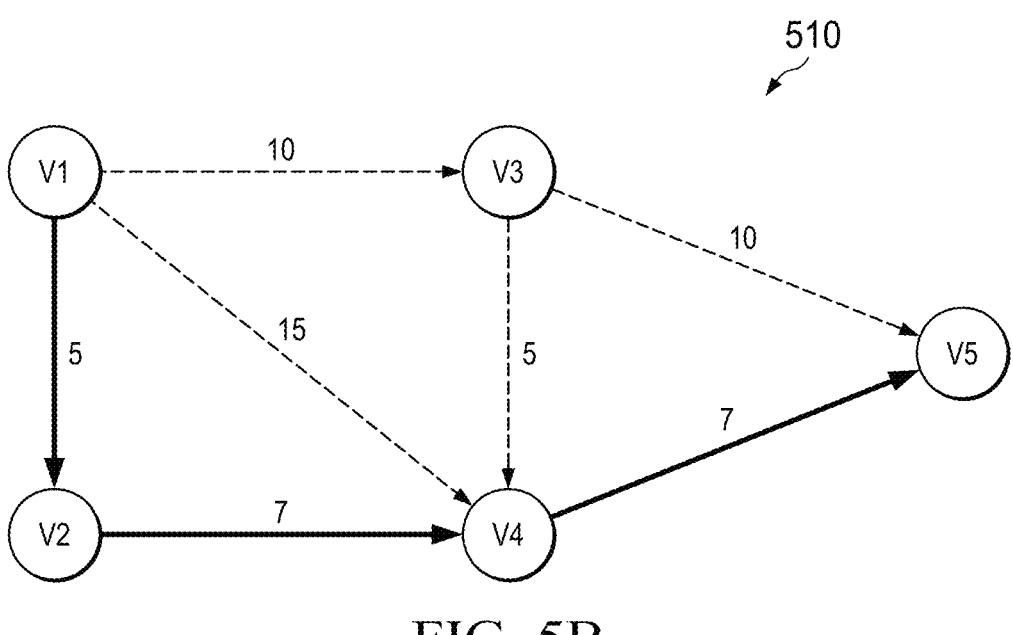

FIG. 5A depicts an example Graph 500 that may employ within Dijkstra's algorithm. In a Weighted (e.g., connected) graph where all edge weights are positive, Dijkstra's algorithm determines the shortest path to travel from one point to another. The depicted example shows such a Graph but one that is much simpler than the Graphs generally used within the described system. In the depicted Graph, the circles represent the Graph nodes, the line segments are the Graph edges, and the numbers, which represent the cost of traveling from one vertex to the next, are the edge weights. The depicted example demonstrates an attempt to find the shortest path between vertex v1 and vertex v5. The result of Dijkstra's algorithm 510 is shown in FIG. 5B, where the optimal path has a total cost of 19, whereas the cost for all other paths is much larger.

In some embodiments, the edge weights represent the time for an aircraft to travel between adjacent vertices, and the vertices in the graph lie at important locations along the travel routes, for Weighted Graphs employed within the described system. Dijkstra's algorithm is used to find the shortest path. However, generally, this computation is not enough to satisfy UTM and UAM/AAM requirements as aircraft must maintain a prescribed separation from each other that is based on the future locational uncertainty in the vehicle.

Example Scenarios

FIGS. 6A-6E depict example aircraft route section scenarios 600 and 610 (as determined by the UTM network calculations module 106) for three sUAS vehicles 620a-c and the deconfliction of these routes. In the depicted example, the airspeed and location uncertainty for the aircraft 620a-c is assumed to be the same. The numbers between the sector nodes represent the flight times between the sectors. The edges of the sectors (vertex) are denoted by the circles 602.

Three sUAS are depicted in the example scenarios 600 and 610 for simplicity—one aircraft is in flight 620b, and two aircraft 602a and 620c are scheduled to depart at time (t=0); however, embodiments of the described system can be deployed to determine route selects for any number of UAM/AAM aircraft. The lines 604 denotes a principal aircraft route, and the lines 606 represent local routes that link the aerodrome/vertiport location to these principal routes. In its simplest form, with just a single aircraft and no other constraints, the graph analytics method identifies the best route by summing up the flight times (i.e., edge weights) for each of the individual flight segments and selecting the route with the shortest total weight. In the example scenarios 600 and 610, t=0 denotes the shortest routes for each of the three individual aircraft. This is illustrated by the thicker lines 604a and 606a.

Figure 6A:
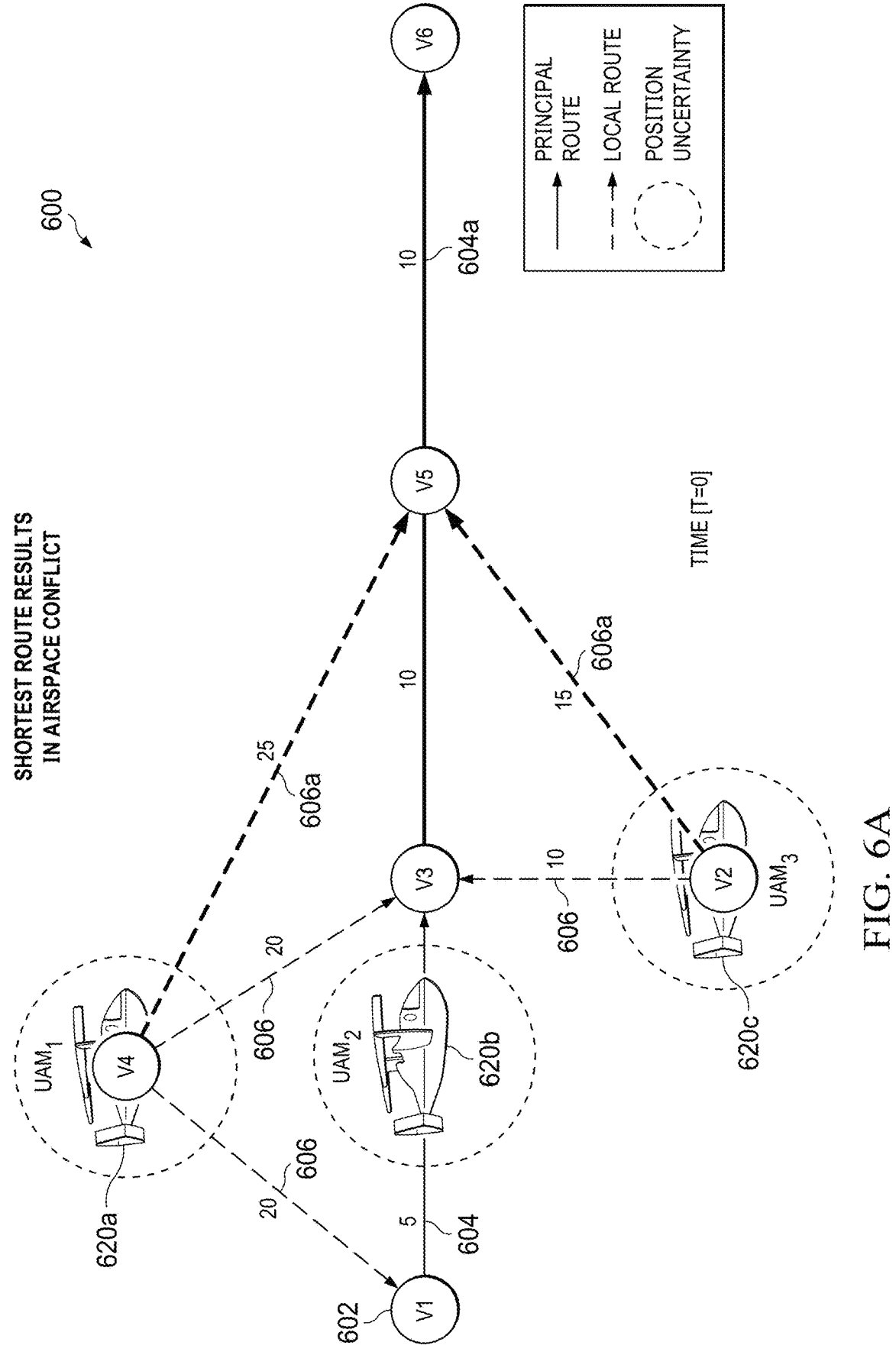
FIGS. 6A-6E depict example aircraft route section scenario for three UAM aircraft and the deconfliction of these routes.
Figure 6B:
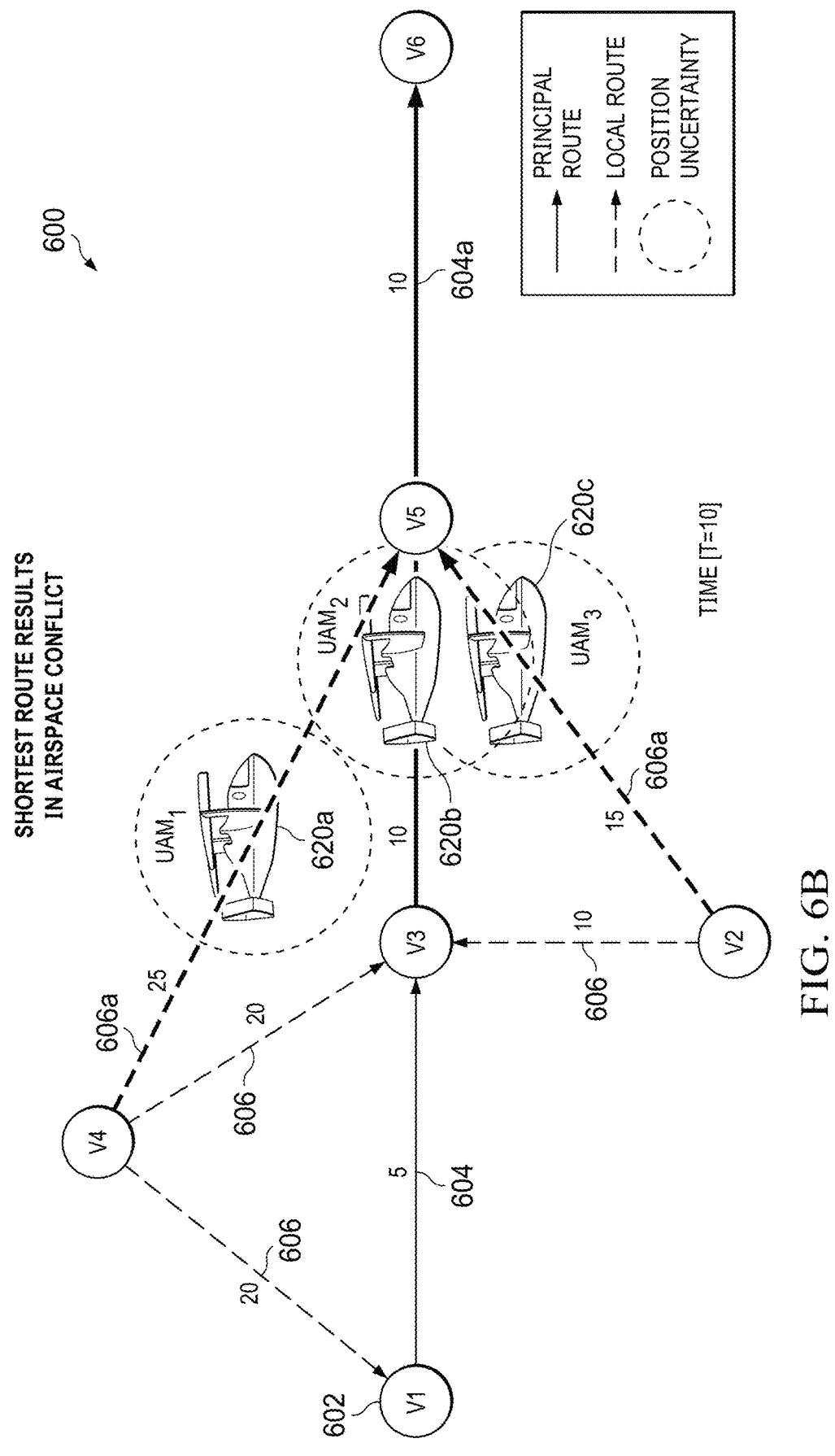
Figure 6C:
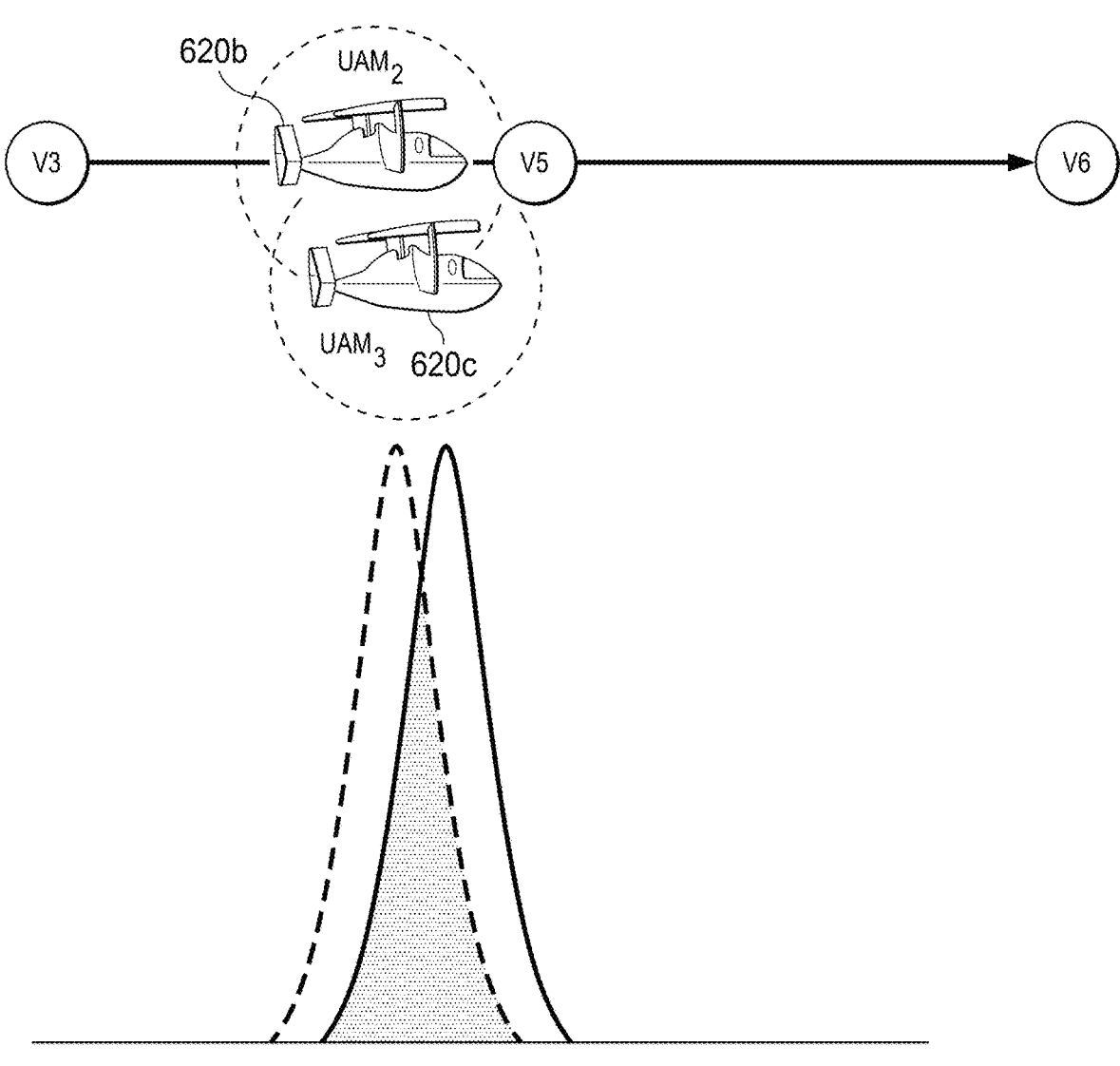

The example scenario 600 results in two of the three aircraft arriving at vertex point 5 at the same time (see FIG. 6C). To address this conflict, in some embodiments, a cost requirement/constraint, associated with aircraft separation requirements, is added to one or more of the edge weights (see the example scenario 610 depicted in FIGS. 6D and 6E). In some embodiments, a cost proportional to the time required to achieve appropriate separation to these two routes with flight conflicts, indicating an adjustment to the route or delay of the aircraft is required, is added.

In some embodiments, to eliminate conflicts, an additional weight that is based on the flight route is assigned through a graph analytics method. In some embodiments, this weighting is based on whether the aircraft is currently enroute versus aircraft that have not yet departed.

Figure 6D:
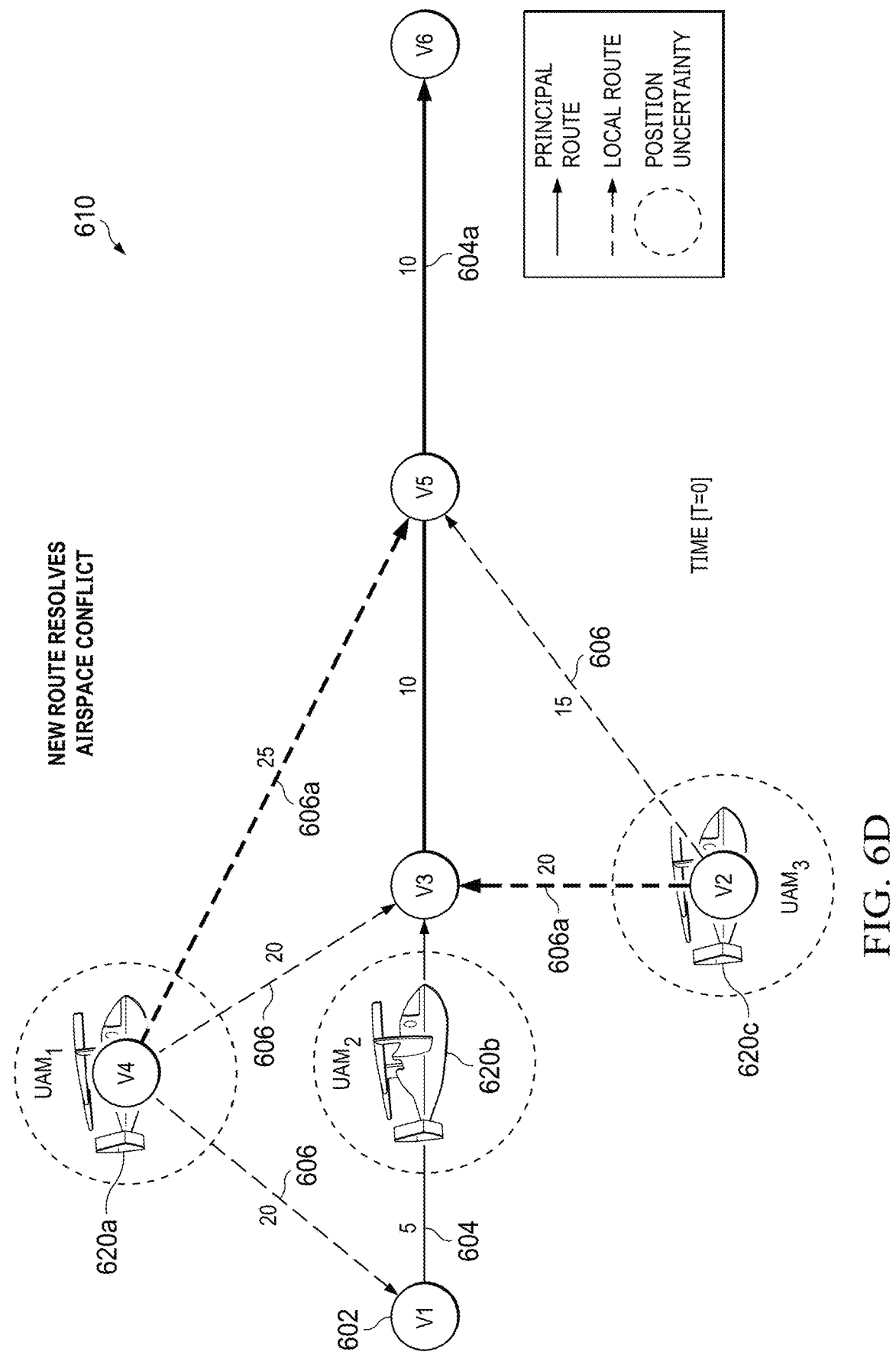
Figure 6E:
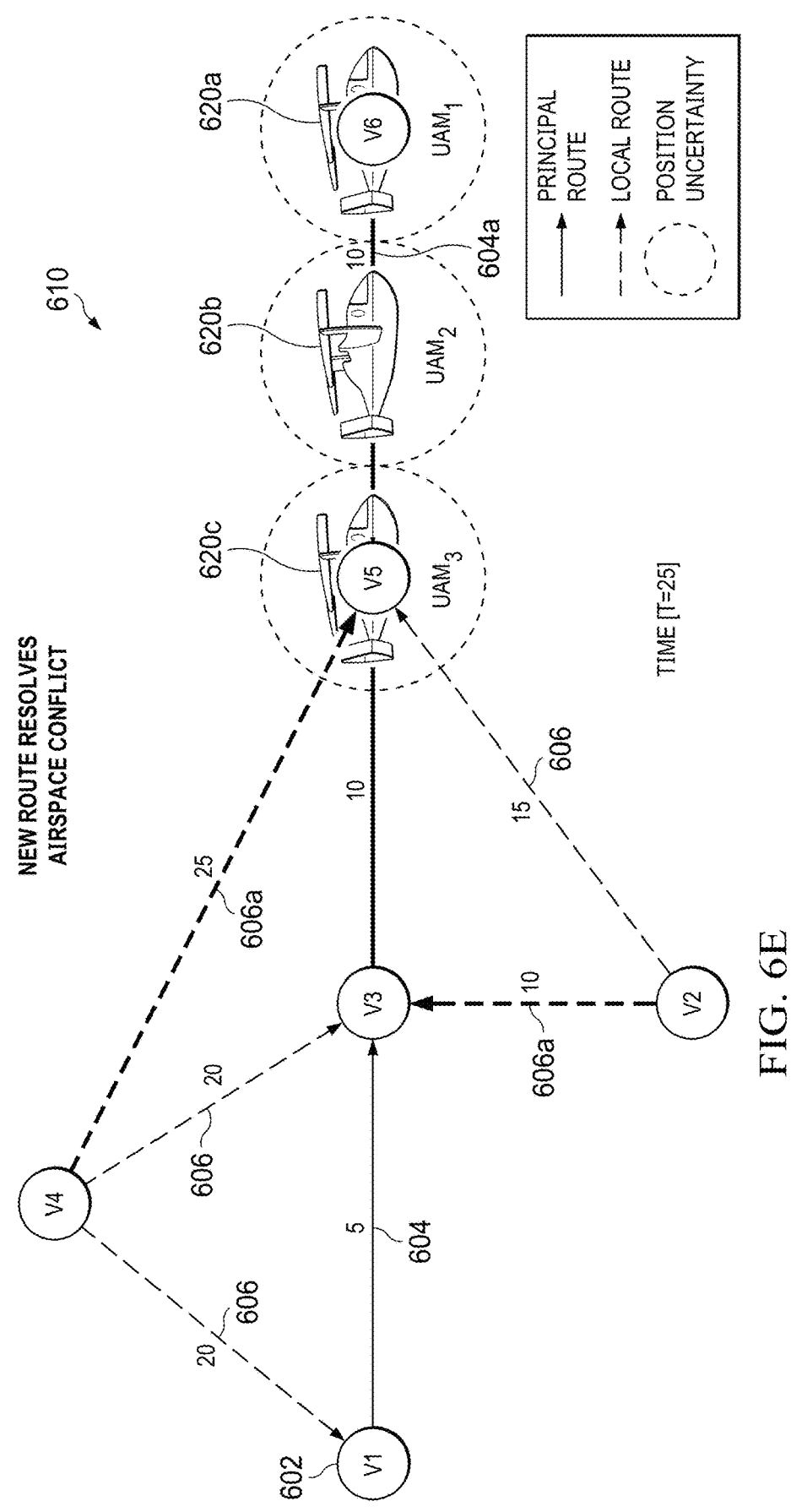

In the depicted example scenario 610, when the relative weights of the sUAS2 and sUAS3 aircraft routes are compared through this process, the inflight sUAS2 aircraft 602b is given priority since it is already in flight; however, other factors, such as distance to the destination, overall flight time, an assigned priority, and so forth, may also be used to determine the relative weights assigned to each flight. As depicted in FIGS. 6D-6E, the route or flight schedule change for the conflict between the two aircraft is resolved within the sUAS3 flight route or schedule. Once the aircraft and routes selected for adjustment are identified, the models are employed to determine combination of routes or schedule changes that have lower cost based on, for example, a next shortest route(s) or schedule changes.

As described above, in some embodiments, the system employs models that are built based on Dijkstra's algorithm once the edge weights (i.e., time to traverse a route segment) are defined. In some embodiments, these models are employed to determine a series of steps as described in FIG. 3 and FIG. 10. These steps include, for example, a combination of along path head wind and tail wind calculations, weather and aircraft information (to determine aircraft location and location uncertainty), and calculations for flight routes and departure/arrival schedules for the aircraft.

In some embodiments, calculation of an optimum route and aircraft departure schedules involves a determination of the shortest route for each aircraft that, along with the location and uncertainty calculation, is employed to determine airspace conflicts where aircraft have the potential to not maintain proper separation. In situations where aircraft separation rules are not maintained, in some embodiments, weights are added via a delay to the aircraft route breaking the separation rule. Dijkstra's algorithm may then be run again for that aircraft to check whether the route with the added weight still is of lowest cost, or whether an alternate route lowers the cost. In some embodiments, the Graph, and therefore Dijkstra's algorithm is modified to accept time-evolving, along-path, mean winds and wind speed variance information, as described above, and the system is supplied new weather information from the JOULES weather model at a given interval (e.g., every 0.1, 0.5, 1, 5, 10, 30, 60, 90, 120, 180, 300, and so forth minutes).

In some embodiments, the aircraft ground speed and corresponding location and location uncertainty calculations are determined based on the along path mean winds and wind speed variance from a moving window (as described above). Such a determination provides an estimate of the possible range of headwinds/tailwinds that the aircraft may have encountered over the time of the flight and corresponding uncertainty in location associated with this departure from the mean conditions.

Example Map

Figure 7A:
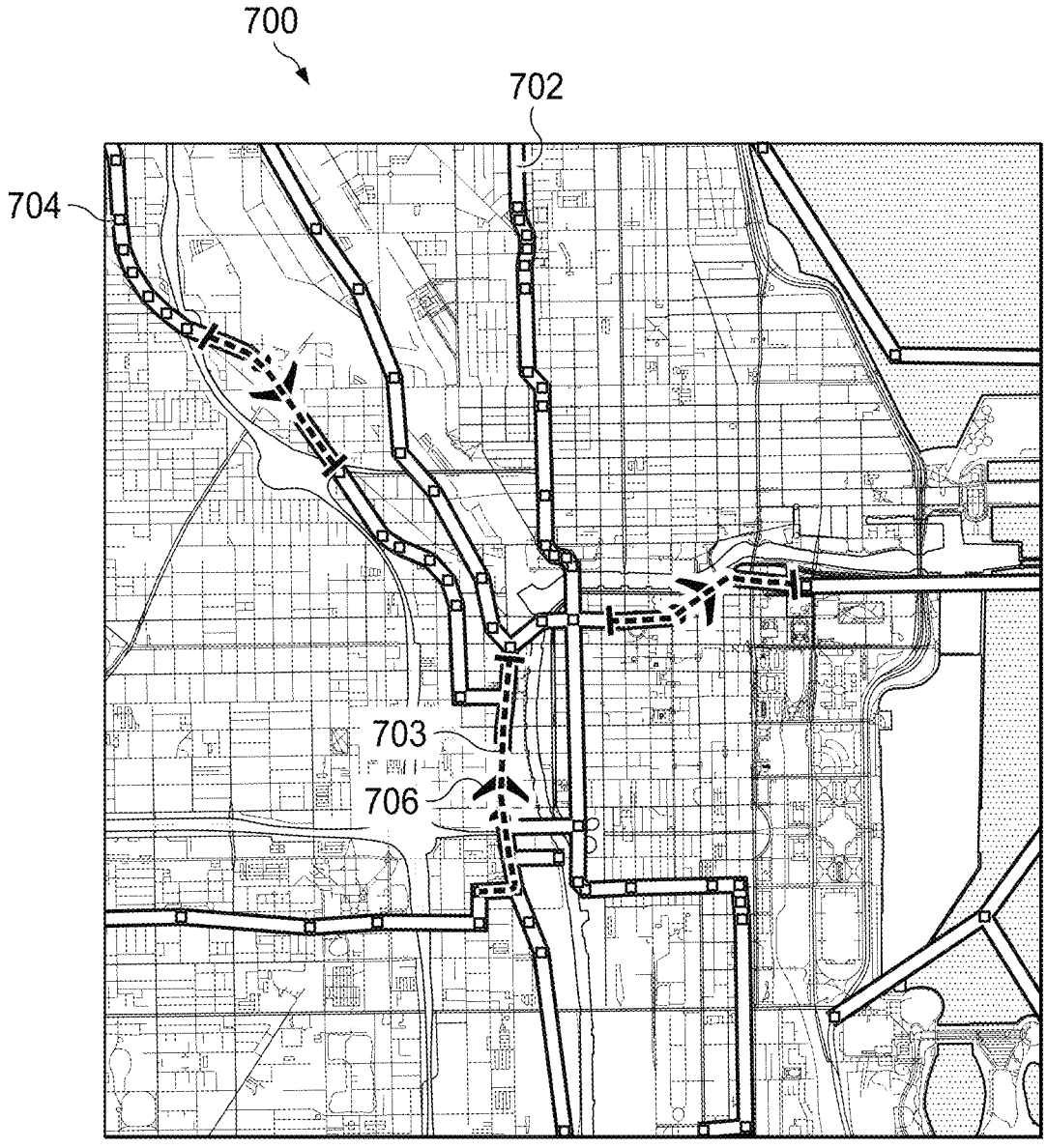
FIGS. 7A and 7B depicts example maps that can be employed by embodiments of the present disclosure.
Figure 7B:
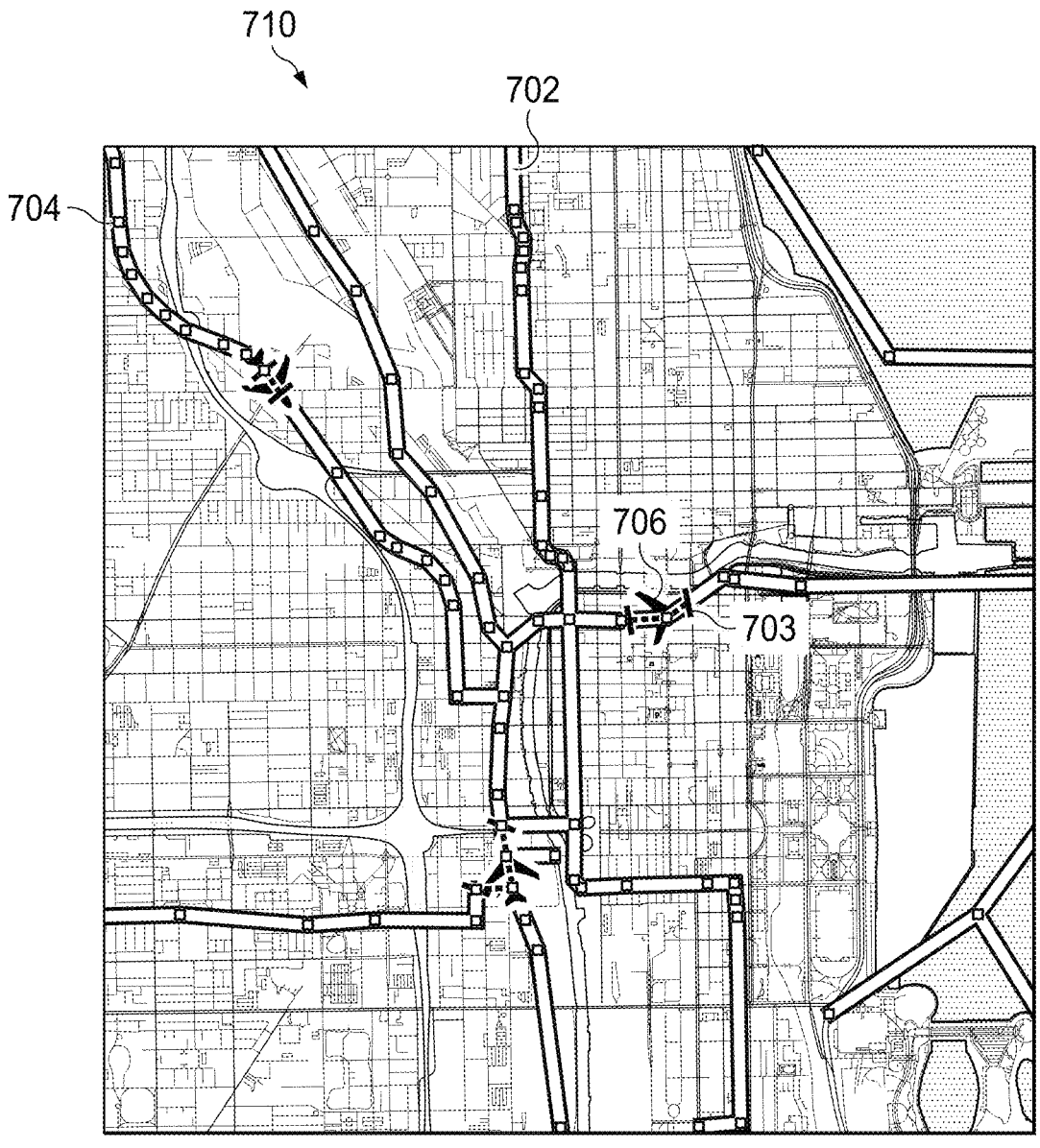

FIGS. 7A and 7B each depict an example map 700 and 710 respectively that includes UTM routes 702, destination/departure nodes 704, sUAS aircraft locations 706, and location uncertainty 703. The example map 700 shows the results of the along flight path uncertainty calculation for a single weather estimate while the example map 710 show the results of the along flight path uncertainty calculation for an estimate of the winds that updates every 5 minutes. The locations and uncertainties vary in both space and time based on the microscale weather conditions each sUAS vehicle has experienced since takeoff. As depicted in both figures, this uncertainty follows the flight path as the aircraft direction changes when they occur between the nodes and is used in the calculations for each aircraft over the full duration of each flight.

In some embodiments, the employed models incorporated time-varying conditions by accepting an updated along-path mean wind speed and wind variance estimate at a temporal interval (e.g., every five minutes) (see FIG. 7B). In some embodiments, new calculations of the location estimate, location uncertainty, and aircraft separation deconfliction are made for the full duration of each flight based on new weather information supplied at this interval. In some embodiments, at the same interval, the location of the in-flight aircraft is known, and the new weather information is used to calculate updated aircraft location and location uncertainty estimates. The position update reduces the along path location uncertainty, while the updated weather information also has an impact on the future location estimate. The two maps 700 and 710 highlights how dynamically updating high-frequency microscale weather improves location and location uncertainty estimates relative to a more-coarse resolution weather model like the NOAA HRRR model.

In some embodiments, in-flight aircraft are given priority over on-ground aircraft scheduled for departure. In some situations, however, new weather information will create new aircraft separation conflicts between the in-flight aircraft. When this occurs, the models, in some embodiments, reduce the speed of the aircraft furthest from its scheduled arrival location and re-calculate the location and uncertainty estimate and associated Dijkstra route selection calculation.

As described above, in some embodiments, calculation is computed for the duration of each flight. In some embodiments, the process is continued until the desired aircraft separation is achieved, at which point the final aircraft route selection and flight schedule are returned (for a given time period). In some embodiments, the process is repeated at the next interval where new flight departure, location, and winds/turbulence information is incorporated into the models allowing for the adaptation to changing weather conditions and demand for airspace access by the UTM or UAM/AAM operators.

Example System

FIG. 8 depicts an example system 800 that includes a computer or computing device 810 that can be programmed or otherwise configured to implement systems or methods of the present disclosure. For example, the computing device 810 can be programmed or otherwise configured to implement the process 1000 described with reference to FIG. 10.

In the depicted embodiment, the computer or computing device 810 includes an electronic processor (also "processor" and "computer processor" herein) 812, which is optionally a single core, a multi core processor, a plurality of processors for parallel processing or a GPU. The depicted embodiment also includes memory 817 (e.g., random-access memory, read-only memory, flash memory), electronic storage unit 814 (e.g., hard disk or flash), communication interface 815 (e.g., a network adapter or modem) for communicating with one or more other systems, and peripheral devices 816, such as cache, other memory, data storage, microphones, speakers, etc. In some embodiments, the memory 817, storage unit 814, communication interface 815 and peripheral devices 816 are in communication with the electronic processor 812 through a communication bus (shown as solid lines), such as a motherboard. In some embodiments, the bus of the computing device 810 includes multiple buses. In some embodiments, the computing device 810 includes more or fewer components than those illustrated in FIG. 8 and performs functions other than those described herein.

In some embodiments, the memory 817 and storage unit 814 include one or more physical apparatuses used to store data or programs on a temporary or permanent basis. In some embodiments, the memory 817 is volatile memory and requires power to maintain stored information. In some embodiments, the storage unit 814 is non-volatile memory and retains stored information when the computer is not powered. In further embodiments, memory 817 or storage unit 814 is a combination of devices such as those disclosed herein. In some embodiments, memory 817 or storage unit 814 is distributed across multiple machines such as a network-based memory or memory in multiple machines performing the operations of the computing device 810.

In some embodiments, the storage unit 814 is a data storage unit or data store for storing data. In some instances, the storage unit 814 store files, such as drivers, libraries, and saved programs. In some embodiments, the storage unit 814 stores user data (e.g., user preferences and user programs). In some embodiments, the computing device 810 includes one or more additional data storage units that are external, such as located on a remote server that is in communication through an intranet or the internet.

In some embodiments, methods as described herein are implemented by way of machine or computer executable code stored on an electronic storage location of the computing device 810, such as, for example, on the memory 817 or the storage unit 814. In some embodiments, the electronic processor 812 is configured to execute the code. In some embodiments, the machine executable or machine-readable code is provided in the form of software. In some examples, during use, the code is executed by the electronic processor 812. In some embodiments, the code is retrieved from the storage unit 814 and stored on the memory 817 for ready access by the electronic processor 812. In some situations, the storage unit 814 is precluded, and machine-executable instructions are stored on the memory 817.

Examples of operations performed by the electronic processor 812 can include fetch, decode, execute, and write back. In some embodiments, the electronic processor 812 is a component of a circuit, such as an integrated circuit. One or more other components of the computing device 810 can be optionally included in the circuit. In some embodiments, the circuit is an application specific integrated circuit (ASIC) or a field programmable gate arrays (FPGAs). In some embodiments, the operations of the electronic processor 812 can be distributed across multiple machines (where individual machines can have one or more processors) that can be coupled directly or across a network.

In some embodiments, the computing device 810 is optionally operatively coupled to a communication network, such as the network 910 described with reference to FIG. 9, via the communication interface 815. In some embodiments, the computing device 810 communicates with one or more remote computer systems through the network. In some embodiments, a user can access the computing device 810 via the network. In some embodiments, the computing device 810 is configured as a node within a peer-to-peer network.

In some embodiments, the computing device 810 includes or is in communication with one or more output devices 820. In some embodiments, the output device 820 includes a display to send visual information to a user. In some embodiments, the output device 820 displays a user interface (UI) 825 generated by the computing device (for example, software executed by the computing device 810).

In some embodiments, the computing device 810 includes or is in communication with one or more input devices 830 that are configured to receive information from a user. In some embodiments, the input device 830 is a keyboard. In some embodiments, the input device 830 is a keypad (e.g., a telephone-based keypad). In some embodiments, the input device 830 is a cursor-control device including, by way of non-limiting examples, a mouse, trackball, track pad, joystick, game controller, or stylus. In some embodiments, as described above, the input device 830 is a touchscreen or a multi-touchscreen. In other cases, the input device 830 is a microphone to capture voice or other sound input. In other cases, the input device 830 is a camera or video camera. In still further cases, the input device is a combination of devices such as those disclosed herein.

In some embodiments, the computing device 810 includes an operating system configured to perform executable instructions. The operating system is, for example, software, including programs and data that manages the device's hardware and provides services for execution of applications.

It should also be noted that a plurality of hardware and software-based devices, as well as a plurality of different structural components may be used to implement the described examples. In addition, embodiments may include hardware, software, and electronic components or modules that, for purposes of discussion, may be illustrated and described as if most of the components were implemented solely in hardware. In some embodiments, the electronic based aspects of the disclosure may be implemented in software (e.g., stored on non-transitory computer-readable medium) executable by one or more processors, such as electronic processor 812. As such, it should be noted that a plurality of hardware and software-based devices, as well as a plurality of different structural components may be employed to implement various embodiments. It should also be understood that although certain drawings illustrate hardware and software located within particular devices, these depictions are for illustrative purposes only. In some embodiments, the illustrated components may be combined or divided into separate software, firmware, or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Example Environments

Figure 9A:
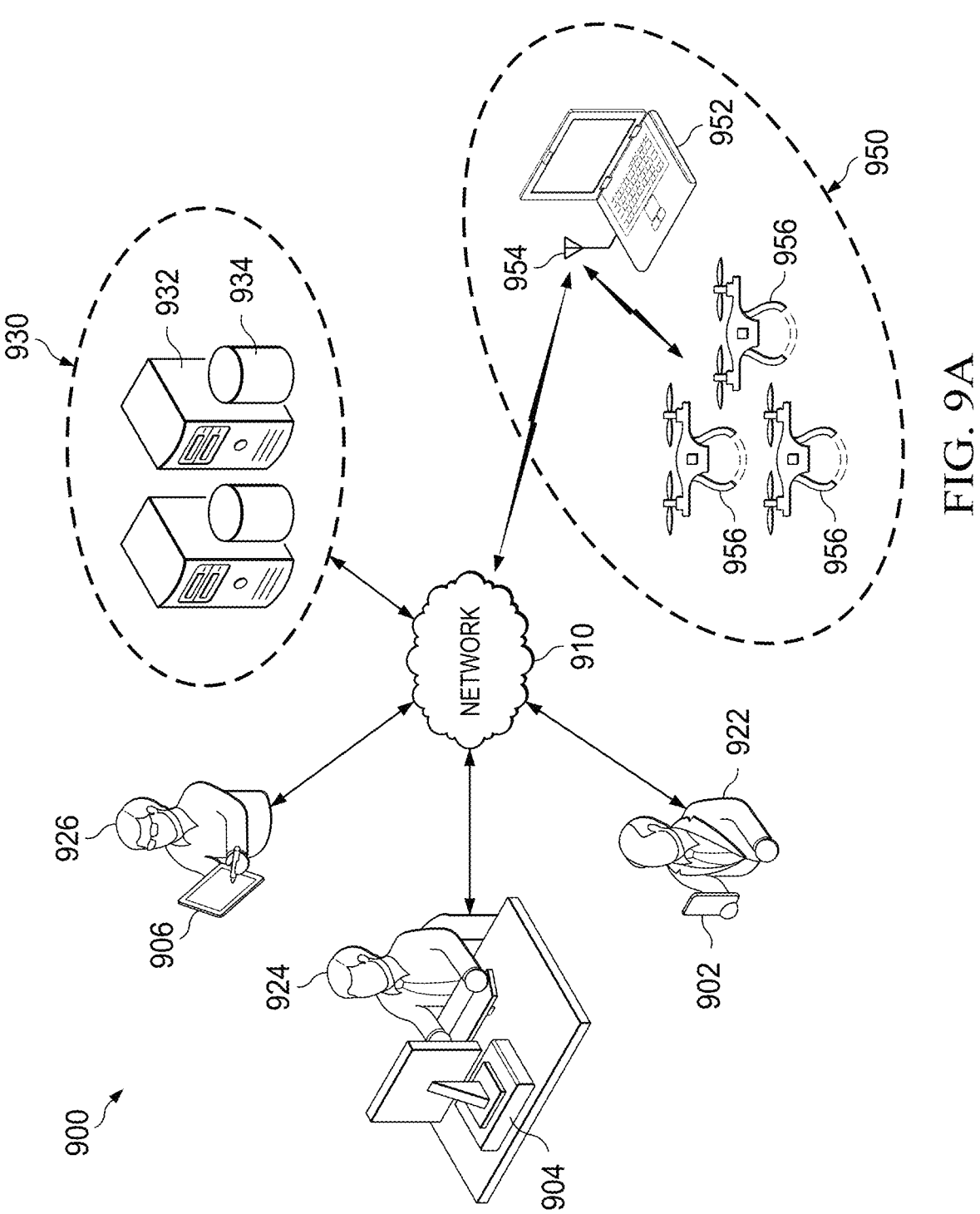
FIG. 9A depicts an example environment that can be employed to execute embodiments of the present disclosure.

FIG. 9A depicts an example environment 900 that can be employed to execute embodiments of the present disclosure. The example system 900 includes computing devices 902, 904, 906; a back-end system 930; a UAS 950, and a communication network 910. The UAS includes a ground-based controller 950 and sUAS vehicles 956.

The communication network (which may be an example of an "intervening internet protocol (IP) network") may include wireless and wired portions. In some embodiments, the communication network 910 is implemented using one or more existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) network, and a public switched telephone network. The network may also include future developed networks. In some embodiments, the 910 includes the Internet, an intranet, an extranet, or an intranet and/or extranet that is in communication with the Internet. In some embodiments, the network 910 includes a telecommunication or a data network.

In some embodiments, the network 910 connects web sites, devices (e.g., the computing devices 902, 904, and 906), and various systems (e.g., the UAS 950, and the back-end system 930). In some embodiments, the network 910 can be accessed over a wired or a wireless communications link. For example, mobile computing devices (e.g., the smartphone device 910, the tablet device 906, the ground-based controller 950) can use a cellular network to access the network 910.

In some examples, the users 922, 924, and 926 interact with the described system through a graphical user interface (GUI), communications software such as the Civilian Team Awareness Kit (CivTak), or another application that is installed and executing on their respective computing devices 902, 904, and 906. In some examples, the computing devices 902, 904, and 906 provide viewing data to screens with which the users 922, 924, and 926, can interact. For example, the users 922, 924, and 926 may view the current flight scheduling or the current location of the sUAS vehicles 956 via their respective computing devices 902, 904, and 906.

In some embodiments, the computing devices 902, 904, and 906 are sustainably similar to computing device 810 depicted in FIG. 8. The computing devices 902, 904, and 906 may each include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. Three user computing devices 902, 904, and 906 are depicted in FIG. 9 for simplicity. In the depicted example environment 900, the computing device 902 is depicted as a smartphone, the computing device 904 is depicted as a tablet-computing device, and the computing device 906 is depicted a desktop computing device. It is contemplated, however, that embodiments of the present disclosure can be realized with any of the appropriate computing devices, such as those mentioned previously. Moreover, embodiments of the present disclosure can employ any number of devices as required.

In some embodiments, the back-end system 930 includes at least one server device 932 and at least one data store 934. In some embodiments, the device 932 is sustainably similar to computing device 810 depicted in FIG. 8. In some embodiments, the back-end system 930 may include server-class hardware type devices. In some embodiments, the server device 932 is a server-class hardware type device. In some embodiments, the back-end system 930 includes computer systems using clustered computers and components to act as a single pool of seamless resources when accessed through the network 910. For example, such embodiments may be used in data center, cloud computing, storage area network (SAN), and network attached storage (NAS) applications. In some embodiments, the back-end system 930 is deployed using a virtual machine(s). In some embodiments, the back-end system 930 is employed to execute the described system to dynamically determine routes in real-time for the sUAS vehicles 956. For example, the back-end system 930 can be employed to execute the process 1000 described with reference to FIG. 10.

In some embodiments, the data store 934 is a repository for persistently storing and managing collections of data. Example data store that may be employed within the described system include data repositories, such as a data-base as well as simpler store types, such as files, emails, and so forth. In some embodiments, the data store 934 includes a database. In some embodiments, a database is a series of bytes or an organized collection of data that is managed by a database management system (DBMS). In some embodiments, the at least one server system 932 hosts one or more computer-implemented services provided by the described system that users 922, 924, and 926 can interact with using the respective computing devices 902, 904, and 906.

In some embodiments, the ground-based controller 952 is a computing device, such as computing device 910, that provides control information, such as the scheduling and route information determined according to embodiments of the present disclosure, to the sUAS vehicles 956. In some embodiments, the ground-based controller 952 establishes a datalink (e.g., a communication and control channel) with each of the sUAS vehicles 956 via the antenna 125. In other embodiments, the datalink is established between the ground-based controller 952 and each of the sUAS vehicles 956 via a cellular network.

In some embodiments, the sUAS vehicles 956 include a computing device, such a computing device 810 depicted in FIG. 8, that is configured to execute an autonomous mode where the UAM/AAM vehicle follows the assigned route and provides feedback to back-end system 930 via the ground-based controller 952.

Figure 9B:
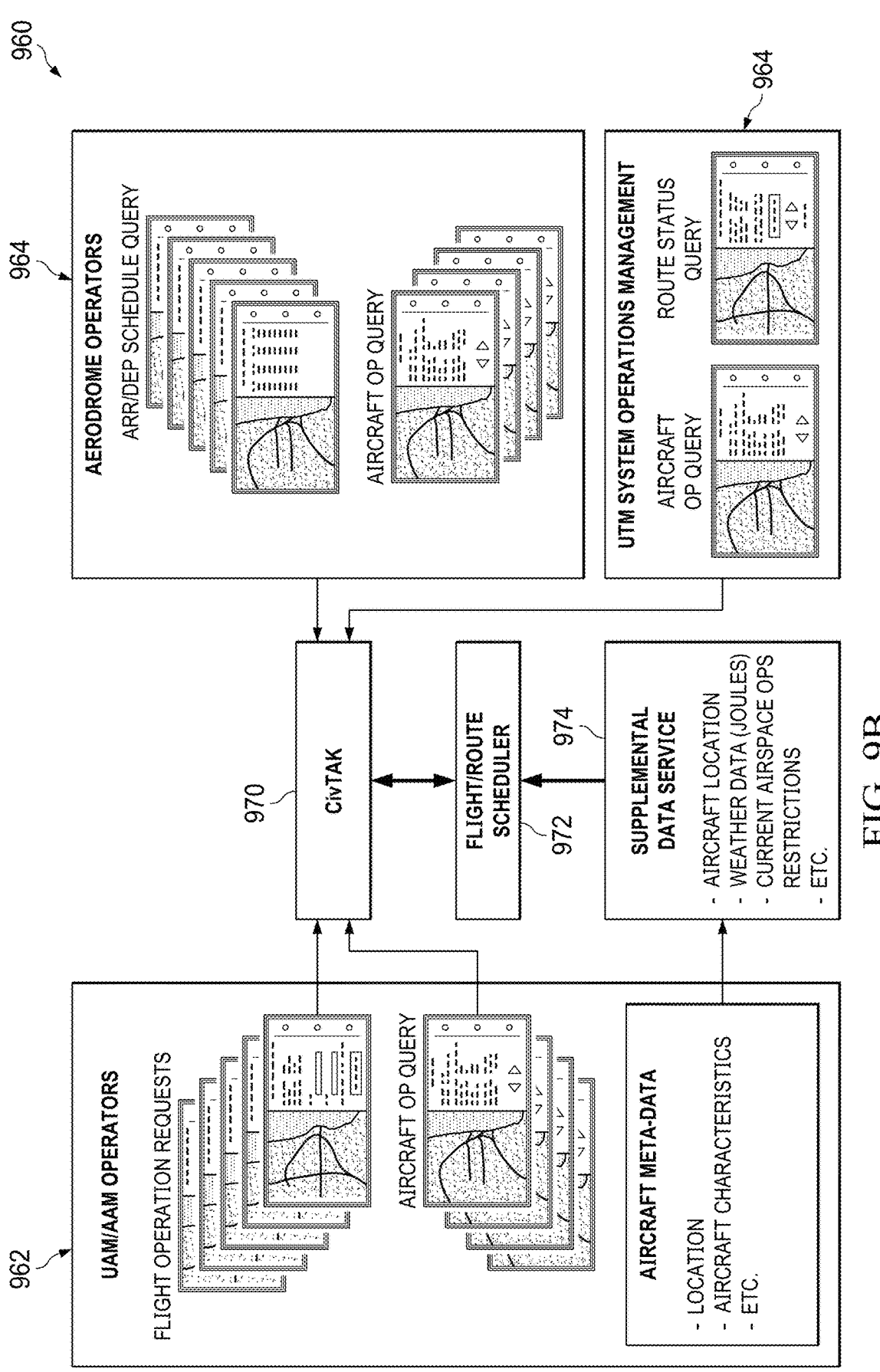
FIG. 9B depicts an example environment 960 that provides an interface with stakeholders who provide flight scheduling requests and need to understand when their aircraft execute flight operations.

FIG. 9B depicts an example environment 960 that pro-vides an interface with stakeholders, such as UAM/AAM operators 962, Aerodrome Operators 964, and UTM System Operations Management 966, who provide, for example, flight scheduling requests and need to understand when their aircraft execute flight operations. To meet this need, the example environment 960 employs the civilian version of the Team Awareness Kit (CivTAK) (CivTAK, 2021) 970. As such, the CivTAK-server information communications hub 970 along with the supplemental data service providers 974 and the flight scheduling and route selection system 972 form the foundation for the environment 960.

Generally, CivTAK provides geospatial information and allows map-based user collaboration that is based on the Android Tactical Assault Kit (ATAK) system developed for the US Military. Tactical Assault Kit (also known as the Team Awareness Kit) (TAK). Generally, TAK is a map-based situational awareness (SA) software application that may be employed to communicate information in tactical environments and provide a common operating picture, blue force tracking, and tactical capabilities (applications). More-over, TAK plug-ins can be deployed to a variety of platforms including Android phones (ATAK), Windows laptops and computers (WinTAK), Web-based platforms (WebTAK), virtual reality environments (VTAK), and on Apple iPhones (iTAK). The CivTAK version is maintained by the TAK Joint Product Center and is available for public use.

In some embodiments, the system employs a CivTAK 970 based application to enable UAM/AAM operators 962 to interface with the flight route selection and route scheduling system 972. Through this CivTAK 970 based application, operators (e.g., the UAM/AAM operators 962) may submit flight operation requests and receive status information regarding their flight or set of flights. In some embodiment, operators may receive geospatial information on the UAM/AAM airspace system operations to monitor the status of current flights, flight schedules, and estimates for future aircraft locations within the system.

Additionally, in some embodiments, users connected to the CivTAK-based UAM/AAM airspace information system 970 may communicate with each other using TAK end-user-devices through the built-in TAK-server communications infrastructure. For example, display capability leverages the TAK server capabilities to link to the UAM/AAM flight scheduling and route selection server which will supply information to the end-user devices on tablets and phones. In some embodiments, the UAM/AAM operators 962, the aerodrome/vertiport operators 964, and the UAM/AAM managers 966 can use TAK end-user-devices to interface with the CivTAK server 970 which then manages the data services with the core system data and traffic management services.

Example Process

Figure 10:
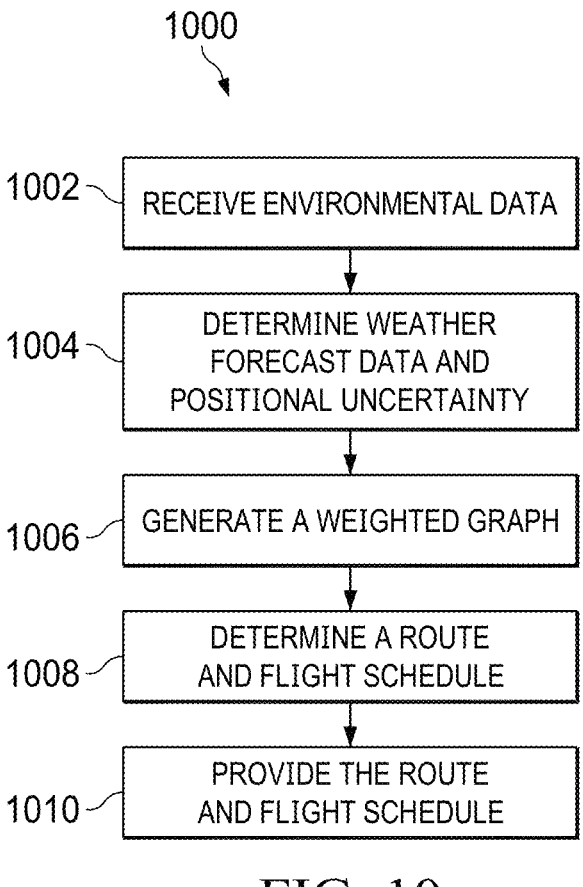
FIG. 10 depicts a flowchart of a non-limiting exemplary process that can be implemented by embodiments of the present disclosure.

FIG. 10 depicts a flowchart of non-limiting, exemplary process 1000 that can be implemented by embodiments of the present disclosure. Generally, the process 1000 decon-flicts sUAS within a domain. For clarity of presentation, the description that follows generally describes the process 1000 in the context of FIGS. 1-9. However, it will be understood that the process the process 1000 may be performed, for example, by any other suitable system or a combination of systems as appropriate. In some embodiments, a processor, such as the processor 812, is configured to execute the process 1000. In some embodiments, the processor is a GPU. In some embodiments, the process is configured to operate at a single flight level, multiple flight levels, and with air-traffic moving in opposite directions. In some embodiments, the process is employed for UTM, UAM, or AAM applications.

At 1002, environmental data for a domain is received. In some embodiments, the environmental data is determined based on operational weather prediction models or weather observations. In some embodiments, the domain includes flight routes for the sUAS vehicles within a geographic region. In some embodiments, the sUAS vehicles move in opposite directions, at different altitudes, and deconflictions in spaces where altitude changes are occurring. From 1002, the process 1000 proceeds to 1004.

At 1004, the environmental data is processed through an atmospheric model of the domain to determine mesoscale and microscale weather forecast data for the domain and a positional uncertainty of the sUAS vehicles within the domain. In some embodiments, the atmospheric model is based on local conditions of the domain. In some embodiments, the local conditions of the domain include at least one of terrain and land-use, building-resolved environmental conditions, aircraft-specific parameters, and local airspace characteristics. In some embodiments, the atmospheric model includes a LES atmospheric model and a JOULES model. In some embodiments, the JOULES model that is adapted to run on the GPU. In some embodiments, the mesoscale and microscale weather forecast data transforms domain specific physical inputs into time-varying realizations of a turbulent flow field. In some embodiments, the domain specific physical inputs include local time-varying weather observations or large-scale time-varying environmental conditions from the atmospheric model. In some embodiments, the mesoscale and microscale weather forecast data includes a wind field that is separated into a deterministic component and a stochastic component. In some embodiments, the Weighted Graph has dynamic edge weights that are determined based on the deterministic and stochastic components. In some embodiments, the Weighted Graph defines uncertainty in future flight positions of the sUAS vehicles based on the stochastic component. From 1004, the process 1000 proceeds to 1006.

At 1006, a Weighted Graph that describes and spans a plurality of possible sUAS vehicle routes over the domain is generated. In some embodiments, the Weighted Graph is generated based on pre-determined or time dependent routes for sUAS travel within the domain and the departure and arrival aerodromes. In some embodiments, the Weighted Graph has time varying weights that are defined according to the mesoscale and microscale weather forecast data, characteristics of the sUAS vehicles, and sUAS performance parameters along a set of flight corridors within the domain that correspond each of the sUAS vehicles. In some embodiments, the characteristics of the sUAS vehicles include a speed of each of the sUAS vehicles. From 1006, the process 1000 proceeds to 1008.

At 1008, a route and a corresponding flight schedule for at least one of sUAS vehicles within the domain is determined based on the Weighted Graph. In some embodiments, the route and the corresponding flight schedule are determined based on a positional uncertainty window among airborne and departing flights that are not allowed to overlap. In some embodiments, the positional uncertainty window is calculated via wind variability and flight specific parameters. In some embodiments, the route is optimized with a strict constraint that the positional uncertainty can never overlap over the flight path. In some embodiments, the route and the corresponding flight schedule are determined based on a search of the Weighted Graph using Dijkstra's algorithm. In some embodiments, a search of the Weighted Graph incorporates flight duration or path length, aircraft separation safety requirements, and aircraft arrival delay relative to a planned arrival time. From 1008, the process 1000 proceeds to 1010.

At 1010 the route and the corresponding flight schedule are provided to the at least one of the sUAS vehicles. In some embodiments, the route and the corresponding flight schedule is provided to the at least one of the sUAS vehicles via a ground-based controller. In some embodiments, the processor is further configured to provide the route and the corresponding flight schedule to an UTM system that controls sUAS traffic for the domain. In some embodiments, the route and the corresponding flight schedule is provided to the UTM system via a ground-based controller. From 1010, the process 1000 ends.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some embodiments, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, CivTAK, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and the like. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, My SQL, Oracle, DB2, and Sybase. In some embodiments, a database is internet-based. In some embodiments, a database is web-based. In some embodiments, a database is cloud computing based. In some embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

In the foregoing specification, specific embodiments have been described. However, various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Thus, the invention provides, among other things, a system for providing routes and corresponding flight schedules for sUAS vehicles. Various features and advantages of the invention are set forth in the following claims.

What is claimed is:
1. A system for deconflicting small Unmanned Aircraft Systems (sUAS) within a domain, comprising:
   a plurality of sUAS vehicles within a domain; and
   a processor;

wherein the processor is configured to:

receive environmental data for the domain, the environmental data determined based on operational weather prediction models or weather observations;

process the environmental data through an atmospheric model of the domain to determine mesoscale and microscale weather forecast data for the domain and a positional uncertainty of the sUAS vehicles within the domain, wherein the mesoscale and microscale weather forecast data includes a wind field that is separated into a deterministic component and a stochastic component;

generate a Weighted Graph that describes and spans a plurality of possible sUAS vehicle routes over the domain, wherein the Weighted Graph has dynamic edge weights that are determined based on the deterministic and stochastic components and the Weighted Graph defines uncertainty in future flight positions of the sUAS vehicles based on the stochastic component;

determine a route and a corresponding flight schedule for at least one of the sUAS vehicles within the domain based on the Weighted Graph; and provide the route and the corresponding flight schedule to the at least one of the sUAS vehicles; and wherein the at least one of the sUAS vehicles of the plurality of sUAS vehicles includes a computing device configured to control operation of the at least one of sUAS vehicle the based on the route.

2. The system of claim 1, wherein the domain includes flight routes for the sUAS vehicles within a geographic region.

3. The system of claim 1, wherein the mesoscale and microscale weather forecast data transforms domain specific physical inputs into time-varying realizations of a turbulent flow field, and wherein the domain specific physical inputs include local time-varying weather observations or large-scale time-varying environmental conditions from the atmospheric model.

4. The system of claim 1, wherein the Weighted Graph is generated based on pre-determined or time dependent routes for sUAS travel within the domain and departure and arrival aerodromes.

5. The system of claim 1, wherein the Weighted Graph has time varying weights that are defined according to the mesoscale and microscale weather forecast data, characteristics of the sUAS vehicles, and sUAS performance parameters along a set of flight corridors within the domain that correspond each of the sUAS vehicles.

6. The system of claim 5, wherein the characteristics of the sUAS vehicles include a speed of each of the sUAS vehicles.

7. The system of claim 1, wherein the atmospheric model is based on local conditions of the domain.

8. The system of claim 7, wherein the local conditions of the domain include at least one of terrain, land-use, building-resolved environmental conditions, aircraft-specific parameters, and local airspace characteristics.

9. The system of claim 1, wherein the route and the corresponding flight schedule are determined based on a positional uncertainty window among airborne flights and departing flights that are not allowed to overlap, wherein the positional uncertainty window is calculated via wind variability and flight specific parameters, and wherein the route is optimized with a strict constraint that the positional uncertainty can never overlap over a flight path.

10. The system of claim 1, wherein the route and the corresponding flight schedule are determined based on a search of the Weighted Graph using Dijkstra's algorithm.

11. The system of claim 7, wherein a search of the Weighted Graph incorporates flight duration or path length, aircraft separation safety requirements, and aircraft arrival delay relative to a planned arrival time.

12. The system of claim 1, wherein the atmospheric model includes a large eddy simulation (LES) atmospheric model and a Joint Outdoor-indoor Urban Large Eddy Simulation (JOULES) model.

13. The system of claim 12, wherein the processor comprises a Graphics Processing Unit (GPU), and wherein the JOULES model that is adapted to run on the GPU.

14. The system of claim 1, wherein the route and the corresponding flight schedule is provided to the at least one of the sUAS vehicles via a ground-based controller.

15. The system of claim 1, wherein the processor is further configured to provide the route and the corresponding flight schedule to an Unmanned Aircraft System Traffic Management (UTM) system that controls sUAS traffic for the domain.

16. The system of claim 1, wherein the route and the corresponding flight schedule is provided to an Unmanned Aircraft System Traffic Management (UTM) system via a ground-based controller.

17. The system of claim 1, wherein the sUAS vehicles move in opposite directions, at different altitudes, and in deconflictions in spaces where altitude changes are occurring.

18. The system of claim 1, wherein the system operates at a single flight level, multiple flight levels, and with air-traffic moving in opposite directions.

19. The system of claim 1, wherein the system is employed for UAS Traffic Management (UTM), Urban Air Mobility (UAM), and Advanced Air Mobility (AAM) applications.

20. A computer implemented method for deconflicting small Unmanned Aircraft Systems (sUAS) within a domain, the method comprising:

receiving environmental data for a domain, the environmental data determined based on operational weather prediction models or weather observations;

processing the environmental data through an atmospheric model of the domain to determine mesoscale and microscale weather forecast data for the domain and a positional uncertainty of a plurality of sUAS vehicles within the domain, wherein the mesoscale and microscale weather forecast data includes a wind field that is separated into a deterministic component and a stochastic component;

generating a Weighted Graph that describes and spans a plurality of possible sUAS vehicle routes over the domain, wherein the Weighted Graph has dynamic edge weights that are determined based on the deterministic and stochastic components and the Weighted Graph defines uncertainty in future flight positions of the sUAS vehicles based on the stochastic component;

determining a route and a corresponding flight schedule for at least one of sUAS vehicles within the domain based on the Weighted Graph; and providing the route and the corresponding flight schedule to the at least one of the sUAS vehicles; and controlling the at least one of the sUAS vehicles based on the route and the corresponding flight schedule.

21. One or more non-transitory computer-readable storage media coupled to one or more processors and having instructions stored thereon which, when executed by the one or more processors, cause the one or more processors to perform operations comprising:

receiving environmental data for a domain, the environmental data determined based on operational weather prediction models or weather observations;

processing the environmental data through an atmospheric model of the domain to determine mesoscale and microscale weather forecast data for the domain and a positional uncertainty of a plurality of small Unmanned Aircraft Systems (sUAS) vehicles within the domain, wherein the mesoscale and microscale weather forecast data includes a wind field that is separated into a deterministic component and a stochastic component;

generating a Weighted Graph that describes and spans a plurality of possible sUAS vehicle routes over the domain, wherein the Weighted Graph has dynamic edge weights that are determined based on the deterministic and stochastic components and the Weighted Graph defines uncertainty in future flight positions of the sUAS vehicles based on the stochastic component;

determining a route and a corresponding flight schedule for at least one of sUAS vehicles within the domain based on the Weighted Graph; and providing the route and the corresponding flight schedule to the at least one of the sUAS vehicles, wherein the at least one of the sUAS vehicles is controlled based on the route and the corresponding flight schedule.

22. The one or more non-transitory computer-readable storage media of claim 21, wherein the route and the corresponding flight schedule for the at least one of sUAS vehicles within the domain is determined based on the Weighted Graph to optimize battery consumption of the sUAS vehicles within the domain.

* * * * *